(12) United States Patent
Maeda

(10) Patent No.: US 11,243,808 B2
(45) Date of Patent: Feb. 8, 2022

(54) INFORMATION PROCESSING APPARATUS AND STORAGE MEDIUM STORING EXECUTION CONTROL PROGRAM

(71) Applicant: FUJITSU LIMITED, Kawasaki (JP)

(72) Inventor: Munenori Maeda, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 183 days.

(21) Appl. No.: 16/807,657

(22) Filed: Mar. 3, 2020

(65) Prior Publication Data
US 2020/0310869 A1    Oct. 1, 2020

(30) Foreign Application Priority Data

Mar. 28, 2019  (JP) .............................. JP2019-062116

(51) Int. Cl.
*G06F 9/48*    (2006.01)

(52) U.S. Cl.
CPC ............ *G06F 9/4881* (2013.01); *G06F 9/485* (2013.01)

(58) Field of Classification Search
CPC ............................... G06F 9/4881; G06F 9/485
See application file for complete search history.

(56) References Cited

U.S. PATENT DOCUMENTS

| 2010/0242041 A1* | 9/2010 | Plondke ................ G06F 9/4812 718/103 |
| 2015/0112967 A1 | 4/2015 | Shimizu et al. |
| 2017/0123850 A1 | 5/2017 | Nakazawa |

FOREIGN PATENT DOCUMENTS

| JP | 2016-48577 A | 4/2016 |
| JP | 2017-90961 A1 | 5/2017 |

* cited by examiner

*Primary Examiner* — Camquy Truong
(74) *Attorney, Agent, or Firm* — Fujitsu Patent Center

(57) ABSTRACT

An information processing apparatus includes a memory and a processor. The memory stores a first queue being registered a newly generated task, and a second queue being registered a thread in an executable state among threads assigned to the task. The processor performs a process including: judging execution priority of a second task registered in the first queue and of a second thread registered in the second queue when execution of a first task by a first thread ends, retrieving, if it is judged that the second thread is to be executed first, the second thread from the second queue and executing a task, to which the second thread is assigned, by the second thread, and retrieving, if it is judged that the second task is to be executed first, the second task from the first queue and executing the second task by the first thread.

18 Claims, 21 Drawing Sheets

FIG. 12

| STATE | TASK BEING EXECUTED | EXECUTION QUEUE | | | | | | | NUMBER OF IDLE THREADS |
|---|---|---|---|---|---|---|---|---|---|
| INITIAL | TSK11 (THR11) | | | | | | | | 3 |
| ST11 | TSK11 (THR11) | TSK12 (THR12) | | | | | | | 3→2 |
| ST12 | TSK11 (THR11) | TSK12 (THR12) | TSK13 (THR13) | | | | | | 2→1 |
| ST13 | TSK11 (THR11) | TSK12 (THR12) | TSK13 (THR13) | TSK1 (THR1) | | | | | 1 |
| ST14 | TSK11 (THR11) | TSK12 (THR12) | TSK13 (THR13) | TSK1 (THR1) | TSK14 (THR14) | | | | 1→0 |
| ST15 | TSK11 (THR11) | TSK12 (THR12) | TSK13 (THR13) | TSK1 (THR1) | TSK14 (THR14) | TSK2 (THR2) | | | 0 |
| ST16 | TSK11 (THR11) | TSK12 (THR12) | TSK13 (THR13) | TSK1 (THR1) | TSK14 (THR14) | TSK2 (THR2) | TSK3 (THR3) | | 0 |
| ST17 | TSK11 (THR11) | TSK12 (THR12) | TSK13 (THR13) | TSK1 (THR1) | TSK14 (THR14) | TSK2 (THR2) | TSK3 (THR3) | TSK15→TASK QUEUE | 0 |
| ST18 | TSK11 (THR11) | TSK12 (THR12) | TSK13 (THR13) | TSK1 (THR1) | TSK14 (THR14) | TSK2 (THR2) | TSK3 (THR3) | TSK4 (THR4) | 0 |
| ST19 | TSK11 (THR11) | TSK12 (THR12) | TSK13 (THR13) | TSK1 (THR1) | TSK14 (THR14) | TSK2 (THR2) | TSK3 (THR3) | TSK4 (THR4) / TSK16→TASK QUEUE | 0 |
| ST20 | TSK12 (THR12) | TSK13 (THR13) | TSK1 (THR1) | TSK14 (THR14) | TSK2 (THR2) | TSK3 (THR3) | TSK4 (THR4) | TSK15 (THR11) | 0→1→0 |
| ST21 | TSK13 (THR13) | TSK1 (THR1) | TSK14 (THR14) | TSK2 (THR2) | TSK3 (THR3) | TSK4 (THR4) | TSK15 (THR11) | TSK12 (THR12) | 0 |

FIG. 13

| STATE | TASK BEING EXECUTED | EXECUTION QUEUE | | | | NUMBER OF IDLE THREADS | TASK QUEUE | | | |
|---|---|---|---|---|---|---|---|---|---|---|
| INITIAL | TSK11 (THR11) | | | | | | | | | |
| ST31 | TSK11 (THR11) | | | | | 3 | | | | |
| ST32 | TSK11 (THR11) | | | | | 3 | TSK12 | | | |
| ST33 | TSK11 (THR11) | TSK1 (THR1) | | | | 3 | TSK12 | TSK13 | | |
| ST34 | TSK11 (THR11) | TSK1 (THR1) | TSK2 (THR2) | | | 3 | TSK12 | TSK13 | | |
| ST35 | TSK11 (THR11) | TSK1 (THR1) | TSK2 (THR2) | TSK3 (THR3) | | 3 | TSK12 | TSK13 | TSK14 | |
| ST36 | TSK11 (THR11) | TSK1 (THR1) | TSK2 (THR2) | TSK3 (THR3) | | 3 | TSK12 | TSK13 | TSK14 | |
| ST37 | TSK11 (THR11) | TSK1 (THR1) | TSK2 (THR2) | TSK3 (THR3) | TSK4 (THR4) | 3 | TSK12 | TSK13 | TSK14 | |
| ST38 | TSK11 (THR11) | TSK1 (THR1) | TSK2 (THR2) | TSK3 (THR3) | TSK4 (THR4) | 3 | TSK12 | TSK13 | TSK14 | TSK15 |
| ST39 | TSK11 (THR11) | TSK1 (THR1) | TSK2 (THR2) | TSK3 (THR3) | TSK4 (THR4) | 3 | TSK12 | TSK13 | TSK14 | TSK15 |
| ST40 | TSK12 (THR11) | TSK1 (THR1) | TSK2 (THR2) | TSK3 (THR3) | TSK4 (THR4) TSK12 (THR11) | 3→2 | TSK13 | TSK14 | TSK15 | TSK16 |
| ST41 | TSK13 (THR12) | TSK1 (THR1) | TSK2 (THR2) | | | | TSK14 | TSK15 | TSK16 | |

FIG. 14

| STATE | TASK BEING EXECUTED | EXECUTION QUEUE | | | | NUMBER OF IDLE THREADS | TASK QUEUE | | |
|---|---|---|---|---|---|---|---|---|---|
| ST42 | TSK1 (THR1) | TSK2 (THR2) | TSK3 (THR3) | TSK4 (THR4) | | | | TSK14 | TSK15 | TSK16 |
| ST43 | TSK14 (THR13) | TSK2 (THR2) | TSK3 (THR3) | TSK4 (THR4) | TSK12 (THR11) | 2→3 | TSK15 | TSK16 | |
| ST44 | TSK2 (THR2) | TSK3 (THR3) | TSK4 (THR4) | TSK12 (THR11) | TSK1 (THR1) | 3→2 | TSK15 | TSK16 | |
| ST45 | TSK3 (THR3) | TSK4 (THR4) | TSK12 (THR11) | TSK1 (THR1) | TSK14 (THR13) | 2 | TSK15 | TSK16 | |
| ST46 | TSK15 (THR14) | TSK4 (THR4) | TSK12 (THR11) | TSK1 (THR1) | TSK14 (THR13) | TSK2 (THR2) | 2 | TSK16 | |
| ST47 | TSK4 (THR4) | TSK12 (THR11) | TSK1 (THR1) | TSK14 (THR13) | TSK2 (THR2) | TSK3 (THR3) | 2→1 | TSK16 | |
|  |  |  |  |  |  |  | 1 |  |  |

INFORMATION PROCESSING APPARATUS AND STORAGE MEDIUM STORING EXECUTION CONTROL PROGRAM

CROSS-REFERENCE TO RELATED APPLICATION

This application is based upon and claims the benefit of priority of the prior Japanese Patent Application No. 2019-62116, filed on Mar. 28, 2019, the entire contents of which are incorporated herein by reference.

FIELD

The embodiments discussed herein are related to an information processing apparatus and a storage medium storing an execution control program.

BACKGROUND

There is a multithread method as a method of achieving concurrent processing in a computer. In the multithread method, a plurality of tasks is executed using a plurality of threads. A thread is a unit of use of a processor. A hardware resource such as a memory area is assigned to each thread. A task is a unit of processing, and performed by a thread, by the thread being assigned to the task.

The following is proposed for execution control of the thread or the task. For example, a database management system is proposed that allows one thread to execute a plurality of tasks. In this system, a certain thread executes a task, and as a result, a new context not shared between the threads is created. Then, that thread creates a new task and generates a new task using the created context. Japanese Laid-open Patent Publication No. 2016-48577 is an example.

In addition, the following information processor is also proposed. The information processor registers subtasks obtained by division of a task, in a plurality of subtask queues in accordance with a degree of priority of the subtasks. Then, if the number of subtasks to be simultaneously executed exceeds a predetermined threshold, the information processor acquires a subtask from a subtask queue of high priority to create a thread and execute the subtask. Japanese Laid-open Patent Publication No. 2017-90961 is an example.

Incidentally, in a multithread method, it is desired that tasks are executed in an appropriate order. As a method for that, a task queue or an execution queue for thread execution is used. As an example, when a new task is generated, that task is added to a tail end of the task queue. In addition, a leading task in the task queue is retrieved, a thread is assigned to that task, and that thread is added to a tail end of the execution queue. Then, a leading thread in the execution queue is retrieved and the corresponding task is executed by that thread.

As a simple method, a method of assigning one thread to one task is possible. In this method, however, each time execution of the one task ends, switching of the thread takes place. Hence, there is a problem that the number of thread switches increases. When threads are switched, a large overhead occurs due to occurrence of a context switch. Thus, as the number of switches increases, task processing performance degrades.

In one aspect, an objective is to provide an information processor and a storage medium storing an execution control program that may suppress the number of the thread switches.

SUMMARY

According to an aspect of the embodiments, an information processing apparatus includes a memory and a processor. The memory stores a first queue being registered a newly generated task, and a second queue being registered a thread in an executable state among threads assigned to the task. The processor performs a process including: judging execution priority of a second task registered at a head of the first queue and of a second thread registered at a head of the second queue when execution of a first task by a first thread ends, retrieving, if it is judged that the second thread is to be executed first, the second thread from the second queue and executing a task, to which the second thread is assigned, by the second thread, and retrieving, if it is judged that the second task is to be executed first, the second task from the first queue and executing the second task by the first thread.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 12 is a diagram illustrating an example of the task execution control by the comparative example;

FIG. 13 is a (first) diagram illustrating an example of the task execution control by the second embodiment;

FIG. 14 is a (second) diagram illustrating the example of the task execution control by the second embodiment;

DESCRIPTION OF EMBODIMENTS

Hereinafter, description is given of embodiments of the present disclosure with reference to the drawings.

First Embodiment

Figure 1:
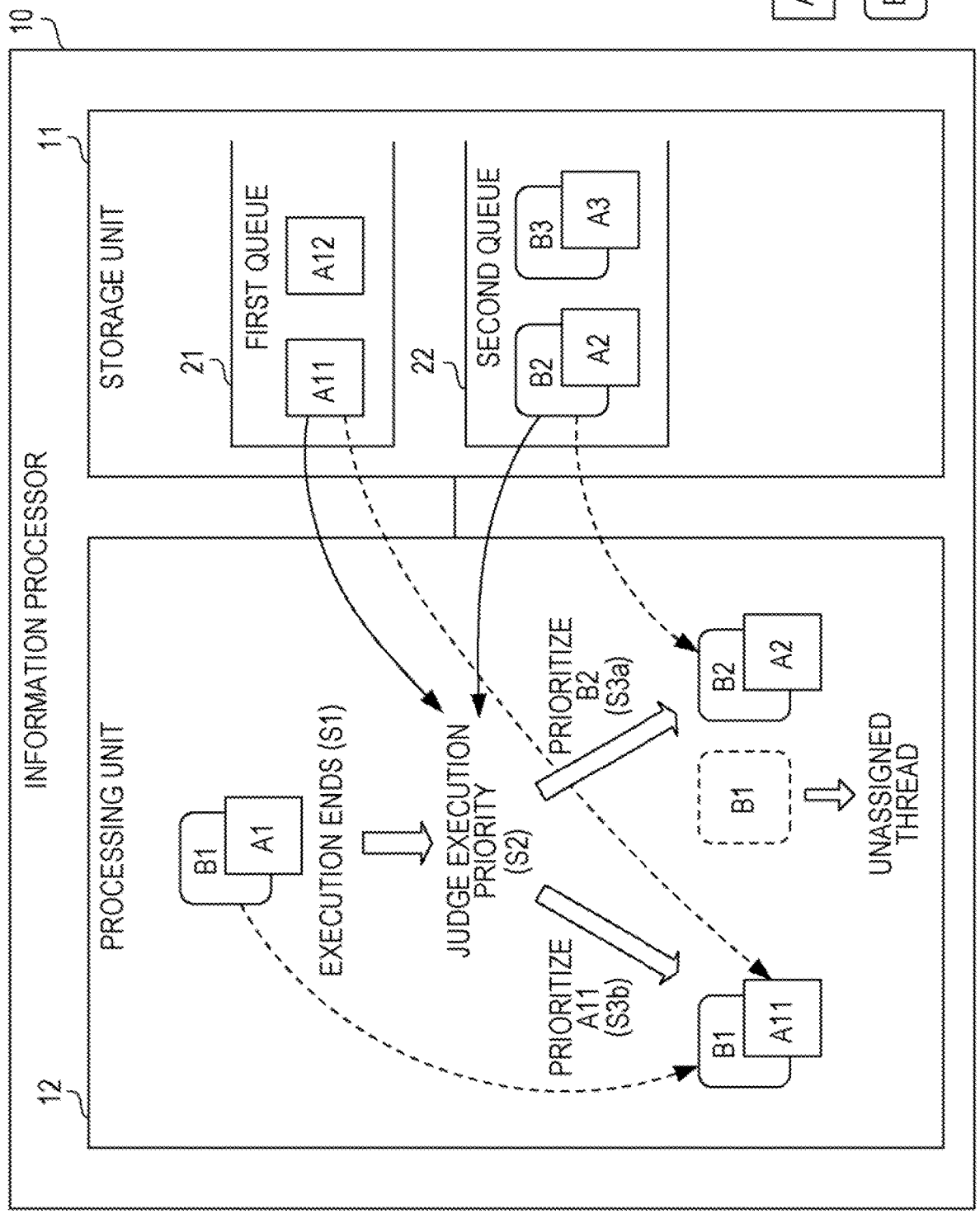
FIG. 1 is a diagram illustrating a configuration example and a processing example of an information processor according to a first embodiment.

FIG. 1 is a diagram illustrating a configuration example and a processing example of an information processor according to a first embodiment. An information processor 10 illustrated in FIG. 1 includes a storage unit 11 and a processing unit 12. The storage unit 11 is implemented by a storage device such as a random-access memory (RAM), for example. The processing unit 12 is a processor, for example. Processing of the processing unit 12 is achieved by the processor executing a program.

The storage unit 11 stores a first queue 21 and a second queue 22. In the first queue 21 are registered tasks that are newly generated. In the example of FIG. 1, tasks A11 and A12 are registered in the first queue 21. In the second queue 22 are registered threads in an executable state, of threads assigned to tasks. For example, a thread that recovers from a standby state or a thread execution of which is suspended by yield and postponed is registered in the second queue 22. In the example of FIG. 1, a thread B2 assigned to a task A2 and a thread B3 assigned to a task A3 are registered in the second queue 22.

The processing unit 12 controls execution of tasks by threads. For example, as illustrated in FIG. 1, suppose that the thread B1 is assigned to the task A1 and the task A1 is executed by the thread B1. When execution of the task A1 by the thread B1 ends in this state (step S1), the processing unit 12 determines a thread or a task to execute next with the following procedure.

The processing unit 12 judges execution priority of a task A11 registered at a head of the first queue 21 and the thread B2 registered at a head of the second queue 22 (step S2). For example, execution order information indicating order of execution is added to respective tasks in the first queue 21 and to respective threads in the second queue 22. In this case, the processing unit 12 may judge the execution priority by comparing the execution order information added to the task A11 and the execution order information added to the thread B2.

If the processing unit 12 judges that the thread B2 is to be executed first, based on the judgment of the execution priority, the processing unit 12 retrieves the thread B2 from the second queue 22 and executes by the thread B2, the task A2 to which the thread B2 is assigned (step S3a). In this case, since the thread to be executed switches from the thread B1 to the thread B2, a context switch occurs. Note that it is possible to cause the thread B1 before being switched to transit to an unassigned thread that is not assigned to a task and to be made available for reuse.

On the other hand, if the processing unit 12 judges that the task A11 is to be executed first, based on the judgment on the execution priority, the processing unit 12 retrieves the task A11 from the first queue 21 and executes the task A11 by the thread B1 that finishes execution of the task A1 (step S3b). In this case, since the tasks A1 and A11 are sequentially executed by the same thread B1, the executing thread is not switched and no context switch occurs.

According to the information processor 10 as described above, as in step S3b, a plurality of tasks may be continuously executed by one thread. This may suppress the number of thread switches.

For example, the information processor 10 assigns a thread to a task that is newly generated and registered in the first queue 21 during an execution stage of the task. This may suppress the number of threads in an execution standby state. As a result, a probability that switching of threads to be executed occurs may be reduced. However, in some cases, the information processor 10 has to re-execute the tasks to which the threads are already assigned (more specifically, the tasks assigned to the threads registered in the second queue 22) due to recovery from the standby state or the yield. Consequently, execution of all of tasks by a single thread is not possible. More specifically, it is not possible to completely avoid occurrence of the switching of the threads to be executed.

Then, using the execution priority as a judging standard, the information processor 10 judges whether to execute the tasks, to which no threads are assigned, in existing threads or to switch the threads to execute the tasks to which the threads are assigned. This makes it possible to suppress the number of switches of the threads to be executed, under a policy of normalizing order of the task execution.

Suppression of the number of the thread switches also suppresses the number of occurrences of context switches involved in the switching of the threads, and reduces overhead due to the occurrence of the context switches. As a result, it is possible to improve task processing performance.

Second Embodiment

In the following, description is given of a storage system to which a storage controller is applied as an example of the information processor 10 illustrated in FIG. 1.

Figure 2:
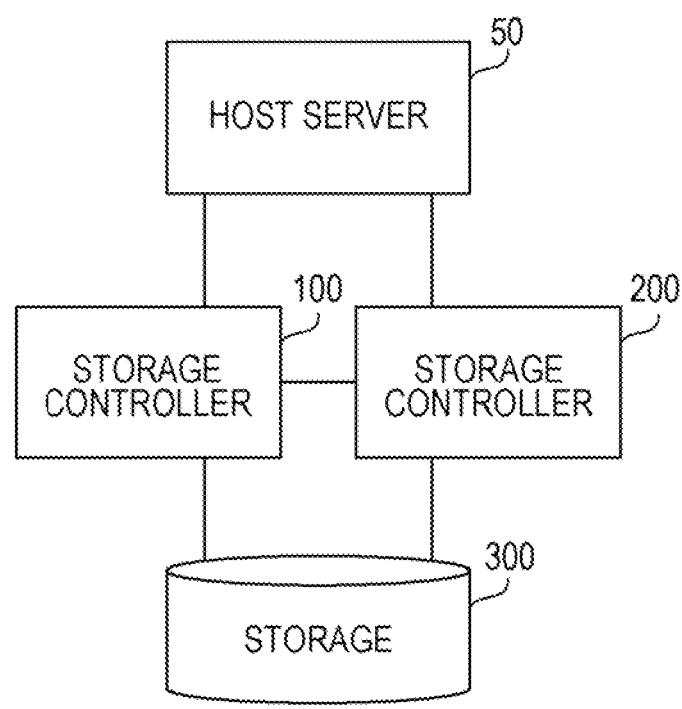
FIG. 2 is a diagram illustrating a configuration example of a storage system according to a second embodiment.

FIG. 2 is a diagram illustrating a configuration example of a storage system according to a second embodiment. As illustrated in FIG. 2, the storage system according to the second embodiment includes a host server 50, a storage controller 100, 200, and a storage 300. Note that the storage controllers 100 and 200 are each an example of the information processor 10 illustrated in FIG. 1.

The host server 50 is, for example, a server computer that performs various types of processes such as business processing.

The storage controllers 100 and 200 process an input/output (I/O) request received from the host server 50. For example, one or more logical volume, which is a target to be accessed from the host server 50, is created using a storage area in the storage 300. The storage controllers 100 and 200 each receive the I/O request for the logical volume from the host server 50 and controls an I/O process on the logical volume. Such storage controllers 100 and 200 are each implemented as a general-purpose server computer. In this case, the storage controllers 100 and 200 perform storage control by executing an application program for storage control.

One or more nonvolatile storage device is mounted in the storage 300. For example, a solid state drive (SSD) is mounted as the nonvolatile storage device in the storage 300.

Note that the host server 50 and the storage controllers 100 and 200 are coupled through the use of, for example, a Fibre Channel (FC) or an Internet Small Computer System Interface (iSCSI), or the like. The storage controller 100 and 200 are coupled to each other through the use of, for example, the FC, the iSCSI, a local area network (LAN), or the like. The storage controllers 100 and 200 being coupled to each other makes, for example, distributed placement of data, data duplication (copying of data from one to the other), or the like, feasible. The storage controllers 100 and 200, and the storage 300 are each coupled through the use of, for example, the FC, the iSCSI, Serial Advanced Technology Attachment (SATA), or the like.

Figure 3:
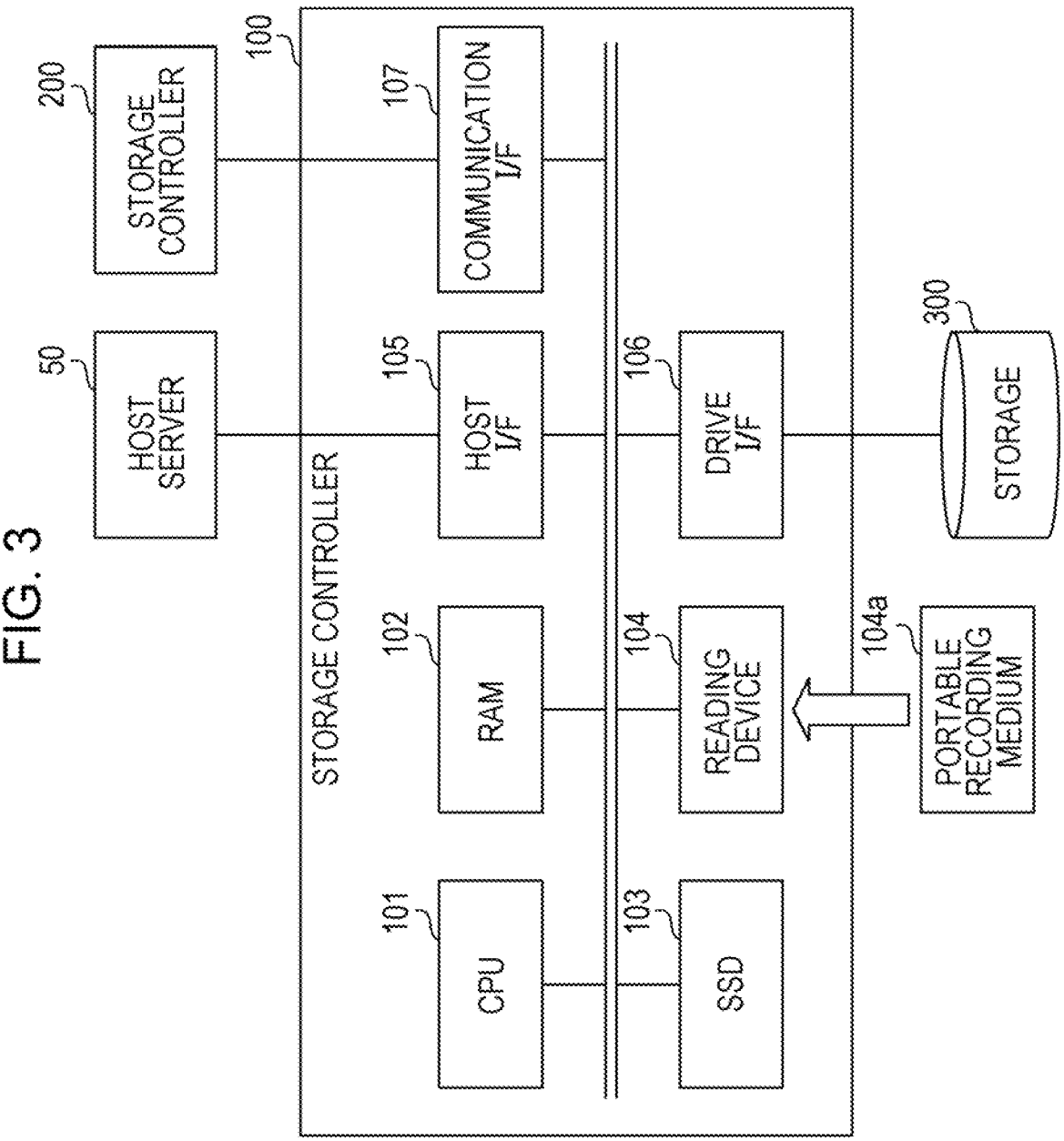
FIG. 3 is a diagram illustrating a hardware configuration example of a storage controller.

FIG. 3 is a diagram illustrating a hardware configuration example of the storage controller. Note that although FIG. 3 illustrates the hardware configuration of the storage controller 100, the storage controller 200 is also implemented by the hardware configuration similar to the storage controller 100.

The storage controller 100 includes a central processing unit (CPU) 101, a RAM 102, an SSD 103, a reading device 104, a host interface (I/F) 105, a drive interface (I/F) 106, and a communication interface (I/F) 107.

The CPU 101 is a processor that reads out a program from the RAM 102 and processes the program. The CPU 101 is a multicore CPU including a plurality of cores (processor cores).

The RAM 102 is used as a main storage device of the storage controller 100. The RAM 102 temporarily stores at least some of an operating system (OS) program or an application program that the CPU 101 is caused to execute. The RAM 102 also stores various types of data desirable for processing by the CPU 101.

The SSD 103 is used as an auxiliary storage device of the storage controller 100. The SSD 103 stores the OS program, the application program, and the various types of data, Note that as the auxiliary storage device, other types of nonvolatile storage device such as a hard disk drive (HDD) may also be used.

A portable recording medium 104a is attached to or detached from the reading device 104. The reading device 104 reads data recorded in the portable recording medium 104a and transmits the data to the CPU 101. Examples of the portable recording medium 104a include an optical disk, a magneto-optical disk, semiconductor memory, or the like.

The host interface 105 is an interface device for communicating with the host server 50. The drive interface 106 is an interface device for communicating with the nonvolatile storage device included in the storage 300. The communication interface 107 is an interface device for communicating with the other storage controller 200.

Figure 4:
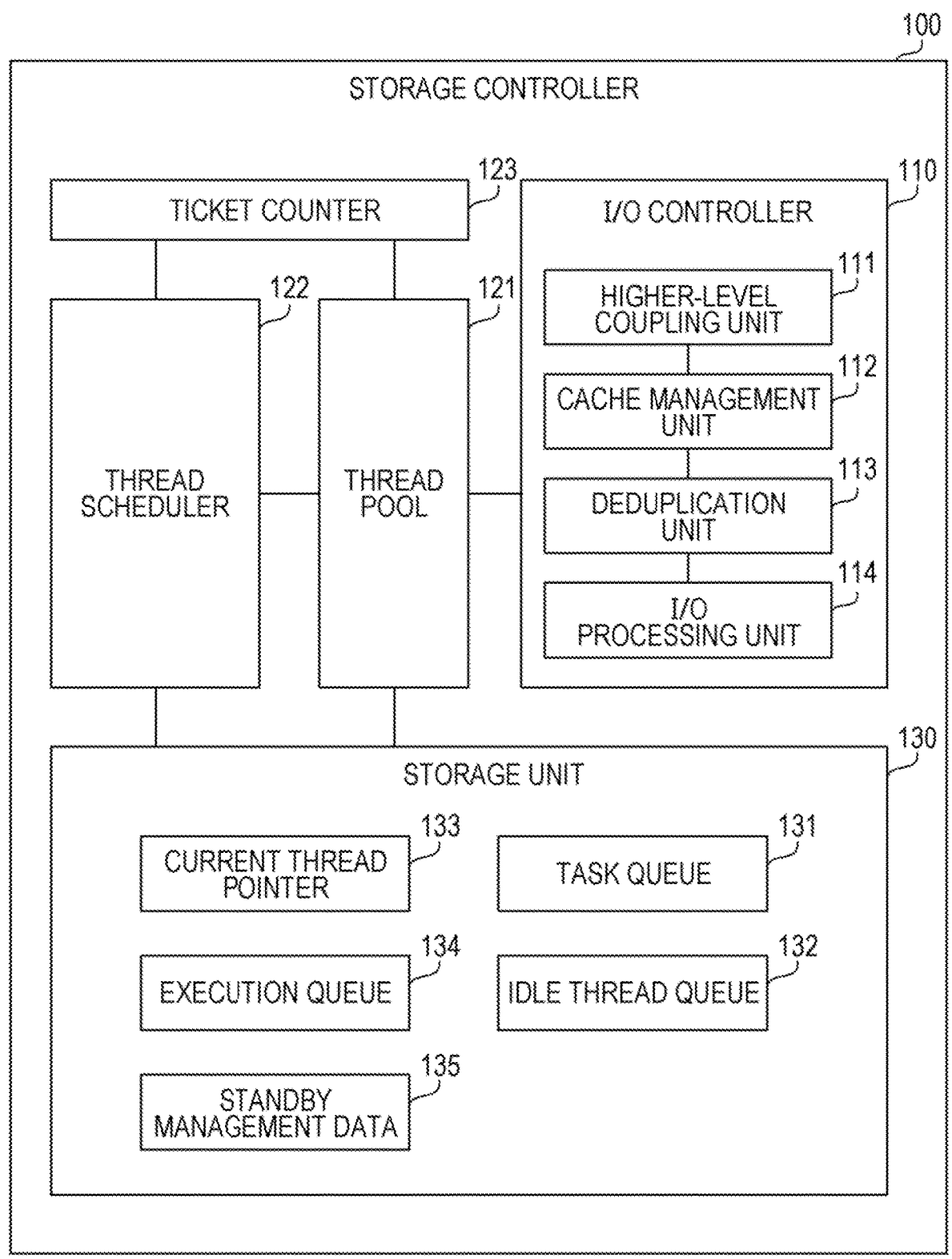
FIG. 4 is a block diagram illustrating a configuration example of a processing function that the storage controller includes.

FIG. 4 is a block diagram illustrating a configuration example of a processing function that the storage controller includes. Note that although FIG. 4 illustrates the configuration of the storage controller 100, the storage controller 200 also includes the processing function similar to the storage controller 100.

The storage controller 100 includes an I/O controller 110, a thread pool 121, a thread scheduler 122, a ticket counter 123, and a storage unit 130. In the storage unit 130 are stored a task queue 131, an idle thread queue 132, a current thread pointer 133, an execution queue (Run Queue) 134, and standby management data 135.

Note that processing of the I/O controller 110, the thread pool 121, the thread scheduler 122, and the ticket counter 123 is achieved by, for example, the CPU 101 executing a predetermined program. The storage unit 130 is implemented by a storage area of the RAM 102, for example.

The I/O controller 110 controls the I/O process on the logical volume responding to the I/O request from the host server 50. The I/O controller 110 includes a higher-level coupling unit 111, a cache management unit 112, a deduplication unit 113, and an I/O processing unit 114, for example.

The higher-level coupling unit 111 receives the I/O request (write request or read request) from the host server 50. The cache management unit 112 controls the I/O process responding to the I/O request received by the higher-level coupling unit 111, using a cache area ensured in the RAM 102. The deduplication unit 113 performs control for deduplicating the data stored in the storage 300 in response to the I/O request. The I/O processing unit 114 writes the deduplicated data in the storage 300. At this time, Redundant Arrays of Inexpensive Disks (RAID) controls writing, for example. In addition, the I/O processing unit 114 reads data from the storage 300.

The thread pool 121, the thread scheduler 122, and the ticket counter 123 are each a function for controlling the task execution using threads. A thread is a unit of use of the CPU 101 for achieving multitask. To each thread is assigned a discrete resource such as a memory area over the RAM 102, or the like. A task is a unit of processing and defined by a function or an argument, for example. In the present embodiment, the task is mainly unit processing that takes place in the respective units of the I/O controller 110. Assignment of a thread to a task results in execution of processing contents of the task. It may be said that the thread is a logical processing entity (logical processor) that executes the task.

The thread pool 121 manages a thread resource. The thread pool 121 manages unused threads that are not assigned to tasks, using the at least idle thread queue 132. In addition, the thread pool 121 manages tasks that are generated, using the task queue 131. When a new task is generated resulting from the task execution by a thread, that task is inputted to the thread pool 121. The thread pool 121 adds the inputted task to a tail end of the task queue 131.

The thread scheduler 122 controls thread execution. Using the execution queue 134, the thread scheduler 122 controls the order of execution of the threads assigned to the tasks. In the execution queue 134 are registered executable (ready-for-execution) threads, of the threads assigned to the tasks. In addition, if in the task queue 131 is registered a task that is to be executed in advance of the task corresponding to the thread registered in the execution queue 134, the thread scheduler 122 controls so that this task is executed first.

Note that the thread scheduler 122 manages threads being currently executed, using the current thread pointer 133. The thread scheduler 122 also manages threads in the standby state, using the standby management data 135.

The ticket counter 123 counts a ticket number and issues the ticket number to the thread pool 121 and the thread scheduler 122. As the ticket number, a unique value is issued so as to represent order. In the present embodiment, as the ticket number, a value in ascending order is issued by a count-up operation. The ticket number is added to a task to be added to the task queue 131 and a thread to be added to the execution queue 134, so that the task is executed in appropriate order.

Note that if the CPU 101 is a multiprocessor, the thread pool 121, the thread scheduler 122, and the ticket counter 123 are individually present in each of processors. In addition, if the CPU 101 is the multicore CPU, the thread pool 121, the thread scheduler 122, and the ticket counter 123 are individually present in each of processor cores.

Figure 5:
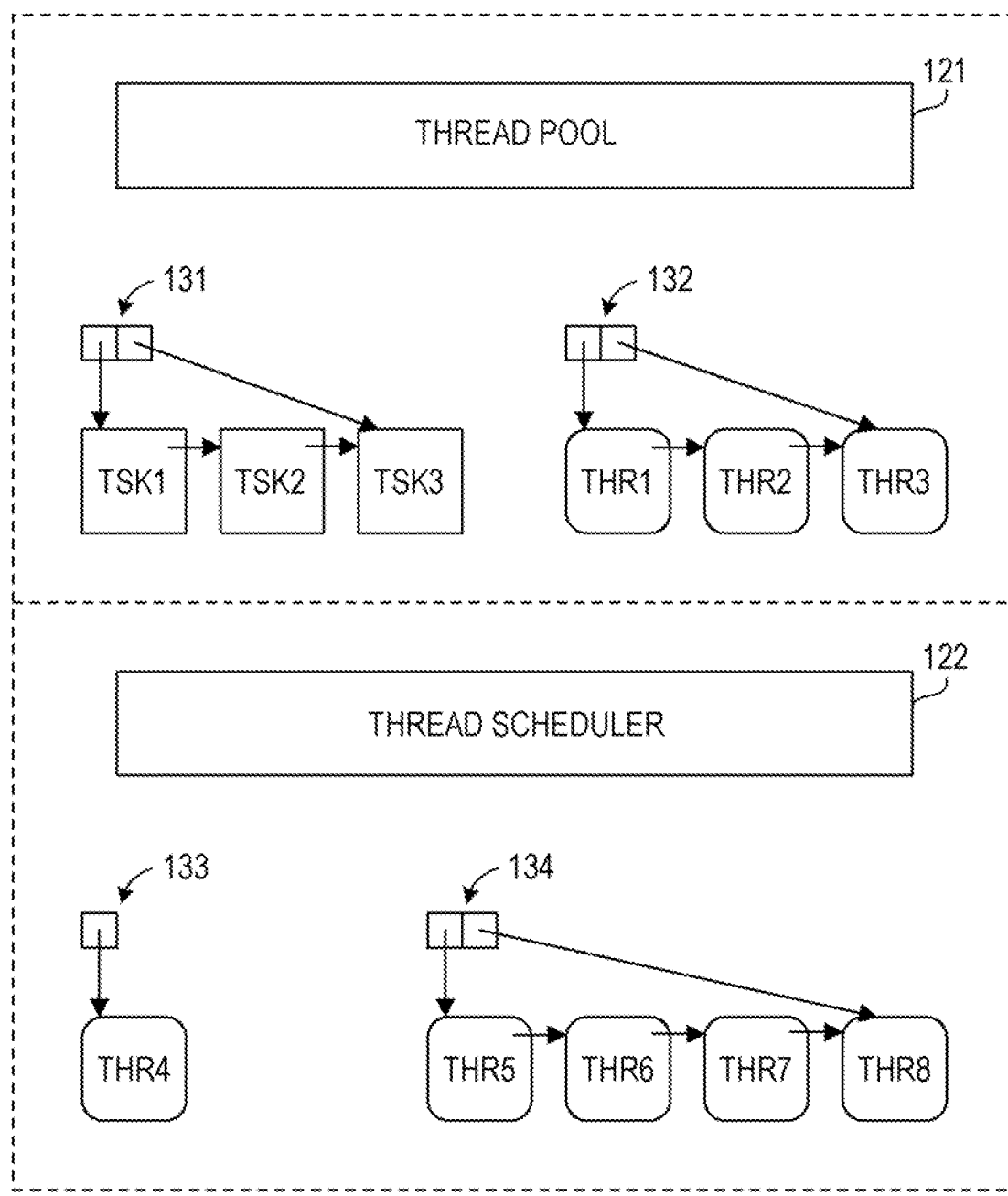
FIG. 5 is a diagram for explaining management of tasks and threads.

FIG. 5 is a diagram for explaining management of the threads and the tasks. First, the task queue 131 is a queue for managing the tasks inputted to the thread pool 121 in order of the input. In an example of FIG. 5, in the task queue 131, tasks of TSK1, TSK2, and TSK3 are registered in sequence from a head. This indicates that the tasks TSK1, TSK2, and TSK3 are inputted in sequence to the thread pool 121.

On the other hand, the threads are managed by the idle thread queue 132, the current thread pointer 133, and the execution queue 134. In addition, the threads are roughly classified into two kinds of idle threads and worker threads. The idle threads are unused threads that are not assigned to tasks. The worker threads are threads that are assigned to tasks and being used. Of these threads, the idle threads are managed by means of the idle thread queue 132.

As described above, the discrete resource is assigned to each of the threads. The threads incur substantial costs for generation such as acquisition or initialization of a resource such as a memory area. This is because the thread pool 121 generates a definite number of threads in advance and ensures resources corresponding to the respective threads.

The idle thread queue 132 is a queue for managing idle queues. In an initial state before the tasks are inputted, all of the threads generated as described above are idle threads. Those idle threads are registered in the idle thread queue 132. Then, if assignment to the task is requested, the thread pool 121 retrieves an idle thread from a head of the idle thread queue 132, and assigns this idle thread to the task. This causes the idle thread to transit to the worker thread. In addition, if the worker thread becomes unwanted, the thread pool 121 adds that worker thread to a tail end of the idle thread queue 132. This causes the worker thread to transit to the idle thread.

Note that in the example of FIG. 5, threads THR1, THR2, and THR3 are registered as the idle threads in the idle thread queue 132. The current thread pointer 133 points to a "current thread", which is currently executed, of the worker threads. In the example of FIG. 5, the thread THR4 is the current thread and the task is being executed by the thread THR4.

The execution queue 134 is a queue for managing worker threads waiting to be executed in order of the worker threads becoming standby for execution. The worker threads waiting to be executed are threads assigned to tasks in an executable state, and examples include threads where yield occurs or threads that recover from the standby state. In the example of FIG. 5, in the execution queue 134, threads THR5, THR6, THR7, and THR8 are registered in sequence from the head. This indicates that the threads THR5, THR6, THR7, and THR8 are added in sequence to the execution queue 134.

The thread scheduler 122 couples the thread retrieved from the head of the execution queue 134 or the thread assigned to the task retrieved from the head of the task queue 131 to the current thread pointer 133 to make that thread the current thread, and executes this thread. In addition, if the current thread becomes unwanted due to termination of the task, the thread scheduler 122 returns the current thread to the thread pool 121.

Note that multithread control methods include a preemptive type and a non-preemptive type (cooperative type). In the preemptive type, for example, within a certain period of time after the thread execution starts, control shifts to the thread scheduler 122 due to an interrupt. With this, an executing thread is switched by the interrupt. In contrast to this, in the non-preemptive type, the executing thread itself passes the control to the thread scheduler 122.

In the present embodiment, the thread scheduler 122 performs the multithread control of the non-preemptive type. In the storage controller 100, tasks with short execution time (small granularity) are generated in large numbers from the I/O controller 110. Therefore, adopting the non-preemptive type and the thread itself becoming responsible for some of thread switching make it possible to increase efficiency of the switching control.

In the meantime, in task execution control using a thread, in some cases, the order of execution may not be defined among tasks or between a task and a thread. For example, even if the task queue 131 as in FIG. 5 is used, the order of the task execution varies depending on in which position of the task queue 131 the task may be inserted. Moreover, even if the execution queue 134 as in FIG. 5 is used, the order of the task execution or the thread execution varies depending on in which position of the execution queue 134 the thread may be inserted. Consequently, if the order of execution is not defined as described above, a task inputted later in time is executed first. More specifically, overtaking of the task may occur.

If the overtaking of the task occurs consecutively and the same task is overtaken several times, that task remains waiting to be executed for a long period of time. A specific task waiting to be executed for a long period of time in this manner is referred to as sinking of a task. In the storage controller 100, the I/O process such as a read or write, or the like, involves a plurality of tasks. However, if the sinking occurs at one task of the plurality of tasks, response performance to the I/O requests degrades. This not only results in an event in which response time of a specific I/O process is extended but also an event in which the response performance seems unstable due to mixing of the I/O processes having different response time. Hence, it is desirable to avoid occurrences of the task sinking as far as possible.

As a method of executing tasks in the order of input, is possible a method that registers a new entry at the tail end of each of the task queue 131 or the execution queue 134 at any given time and assigns one idle thread to one task. Here, using FIG. 6, description is given of a comparative example of the task execution control in a case where such a method is used.

Figure 6:
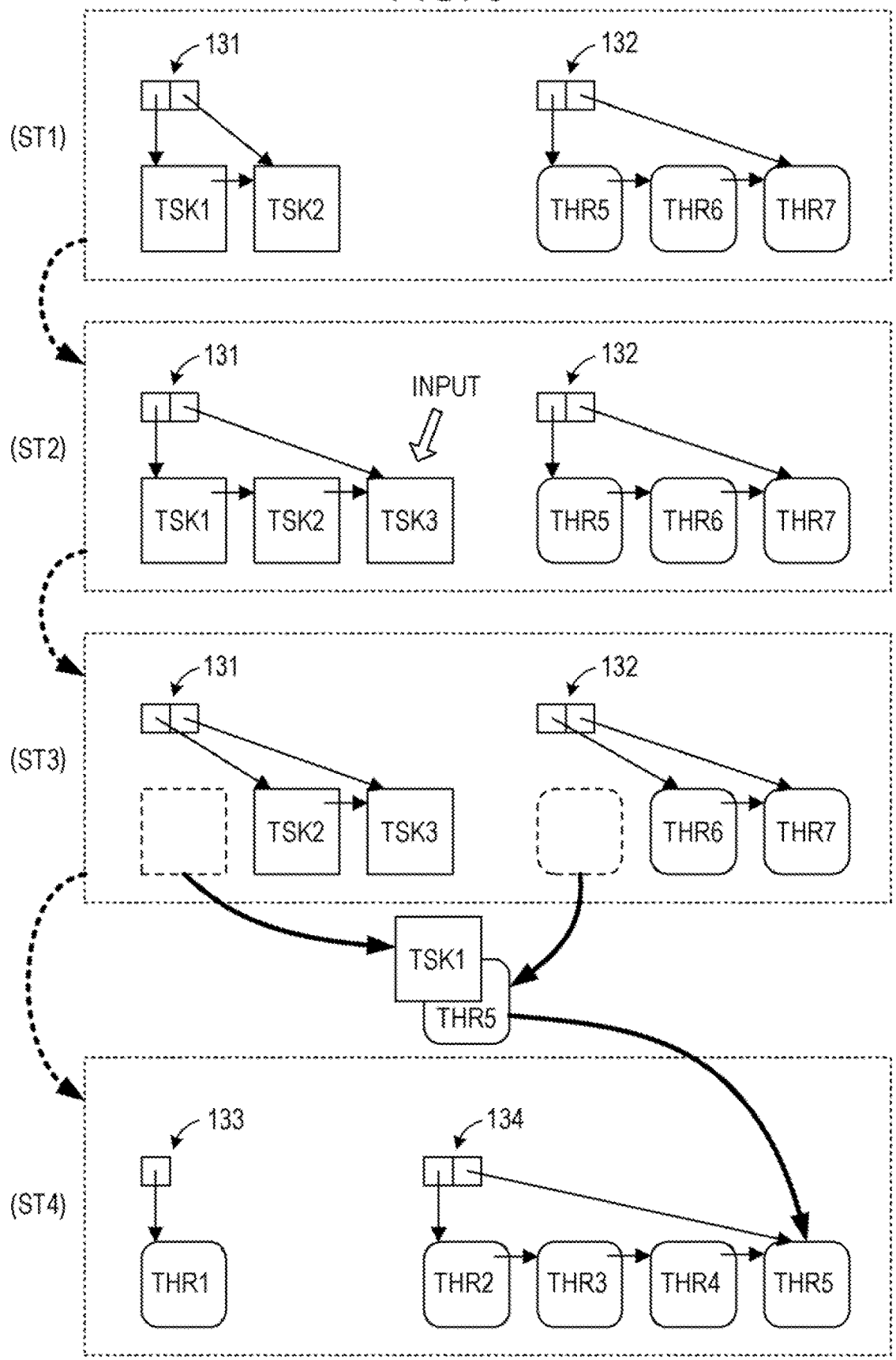
FIG. 6 is a diagram for explaining a comparative example of task execution control.

FIG. 6 is a diagram explaining a comparative example of the task execution control. Note that in FIG. 6, description is given on the assumption that the task execution control is performed using the configuration illustrated in FIG. 5.

In an example of FIG. 6, it is assumed that the tasks TSK1 and TSK2 are registered in sequence in the thread pool 121. As a result, as illustrated in a state ST1, in the task queue 131, the tasks TSK1 and TSK2 are registered in sequence from the head. It is also assumed that in the state ST1, the threads THR5 to THR7 are registered n the idle thread queue 132.

Assume that from this state, the task TSK3 is inputted to the thread pool 121. In this case, as illustrated in a state ST2, the task TSK3 is added to the tail end of the task queue 131. In addition, the thread is assigned from the thread pool 121 to each of the threads registered in the task queue 131, and that thread is added to the tail, end of the execution queue 134. As illustrated in a state ST3, from the state ST2, the task TSK1 is retrieved from the head of the task queue 131, and the thread THR5 retrieved from the idle thread queue 132 is assigned to this task TSK1. Then, as illustrated in a state ST4, the thread THR5 already assigned to the task TSK1 is added to the tail end of the execution queue 134.

In addition, after this, the thread THR6 is assigned to the task TSK2 and that thread THR6 is added to the tail end of the execution queue 134, which is not illustrated, though. Furthermore, the thread THR7 is assigned to the task TSK3 and that thread THR7 is added to the tail end of the execution queue 134. Basically, in the comparative example of FIG. 6, if the tasks in large numbers are registered in the task queue 131, the remaining idle threads are all assigned to the tasks in the task queue 131 and those threads are registered in the execution queue 134.

The thread scheduler 122 retrieves the threads one by one from the head of the execution queue 134 and executes the threads. In the state ST4, the thread THR1 is being executed, and in the execution queue 134, the threads THR2, THR3, THR4, and THR5 are registered in sequence from the head. If the task execution by the thread THR1 ends in this state, the thread THR1 is added to the tail end of the idle thread queue 132 and returned to the idle threads. Then, the thread THR2 is retrieved from the head of the execution queue 134 and coupled to the current thread pointer 133, and execution of the thread THR2 starts. Furthermore, subsequently, the threads THR3, THR4, and THR5 are retrieved in sequence from the execution queue 134 with a similar procedure and executed. In addition, the thread that finishes the task execution is returned to the idle threads.

In this manner, the tasks being assigned to the threads in order of the tasks being inputted and the threads being added to the tail end of the execution queue 134 make it possible to execute the tasks in the order of the tasks being inputted. This may reduce a likelihood that the sinking of tasks occurs.

However, in a method of FIG. 6, each time the task assigned to the thread ends, the thread is switched and the context switch occurs. In the context switch, the processing load is heavy because rewriting of a register or the like is performed. In addition, as more efforts are made to concurrently process many tasks, the number of threads increases, thus also increasing the number of the occurrences of the context switches accordingly. For example, as described above, the granularity of each of the tasks is small in the storage control and yet many I/O processes occur in a short period of time. Thus, thousands to tens of thousands of threads may be generated. Consequently, the number of the occurrences of the context switches increases, processing overhead increases accordingly, and thus I/O processing performance degrades. Moreover, since addition of the thread to the idle thread queue 132 is performed each time the task assigned to the thread ends, the overhead further increases.

Due to the small granularity of the task, the overhead is relatively large to task execution time, which substantially affects the I/O processing performance. Therefore, it is desired that the number of the thread executions (number of worker threads) be decreased to improve performance and that the number of thread switches or transitions to the idle threads be reduced. Furthermore, the larger the number of threads is, the larger a desirable memory area is. If the memory area is pressed by the thread, locality of the memory area for other processing degrades, resulting in frequent occurrences of a cache miss or a page fault. From such a standpoint, it is also desirable to decrease the number of the threads.

In addition, even if the method of FIG. 6 is used, the order of the task execution may not be appropriate in some cases. For example, there is a case where a thread is suspended as standby occurs while a task is being executed. If the suspended thread recovers from the standby state, that thread is added to the tail end of the execution queue 134. In addition, if yield of a thread occurs, processing of the thread is postponed, and that thread is added to the tail end of the execution queue 134. As such, registration in the execution queue 134 of a thread already assigned to a task as well as a thread newly assigned to the task in the task queue 131 may cause a case where tasks are not executed in order that the tasks are to be executed normally.

For example, if a state occurs in which the idle threads are depleted and no thread may be assigned to a new task, the thread recovered from the standby or the thread in which the yield occurs may be added to the execution queue 134, after the task is inputted to the thread pool 121. In this case, the thread recovered from the standby state or the task assigned to the thread in which the yield occurs is executed in advance of the newly inputted task. Thus, the order of the task execution differs from the order that the tasks are to be executed normally. Moreover, since processing of retrieving the task from the task queue 131 and assigning the task to the thread takes time, there may occur a delay before that thread is registered in the execution queue 134. In this case as well, the thread recovered from the standby state or the task assigned to the thread in which the yield occurs is registered in advance in the execution queue 134 and executed. Thus, the order of the task execution may become inappropriate.

That is, "the order of the task execution is appropriate" as said herein denotes that the tasks are executed so that a preceding-following relationship between input time of a new task to the thread pool 121 and time when the task to which the thread is assigned is added to the execution queue 134 is observed. Even if the method of FIG. 6 is used, it is possible that the tasks may be executed in a state in which such a temporal preceding-following relationship is changed.

Then, through processing illustrated in FIGS. 7 to 10 below, the storage controller 100 of the present embodiment decreases the number of threads to be executed, while normalizing the order of the task execution.

Figure 7:
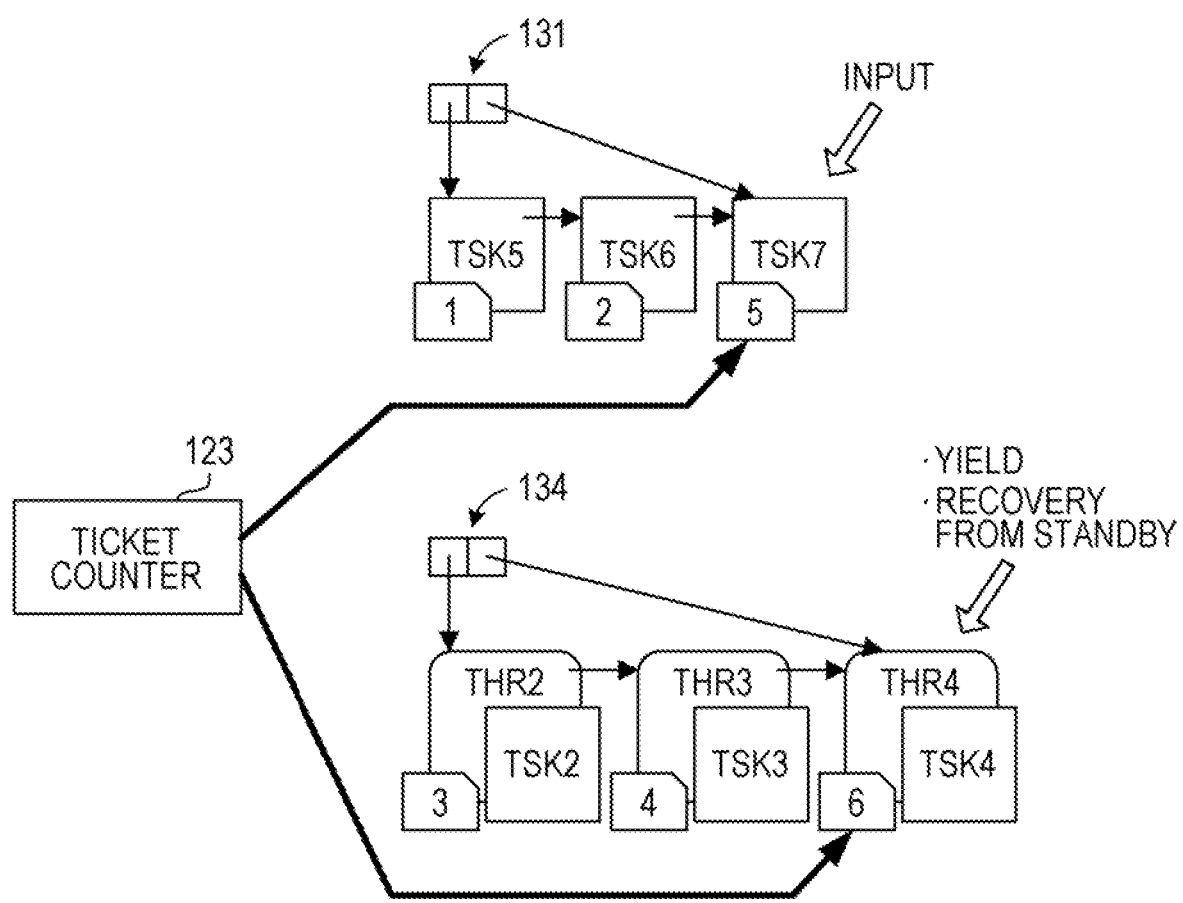
FIG. 7 is a diagram for explaining addition of a ticket number.

FIG. 7 is a diagram for explaining addition of the ticket number. In the storage controller 100, the ticket counter 123 is used to normalize the order of the task execution. The ticket counter 123 is a counter that issues a ticket number representing the order (execution priority) of the task execution or the thread execution. In the present embodiment, the ticket counter 123 issues a ticket number in ascending order. In this case, the smaller the ticket number is, the higher the execution priority is. The ticket number is added to the task to be registered in the task queue 131 and to the thread to be registered in the execution queue 134.

For example, as illustrated in FIG. 7, when a new task is inputted to the thread pool 121 and that task is registered at the tail end of the task queue 131, the ticket number issued by the ticket counter 123 is added to that task. In an example of FIG. 7, when the new task TSK7 is added to the task queue 131, the ticket number "5" is added to the task TSK7.

In addition, as illustrated in FIG. 7, when the thread is registered at the tail end of the execution queue 134 due to the yield occurrence or the recovery from the standby state, the ticket number issued by the ticket counter 123 is added to that thread. In the example of FIG. 7, suppose that the thread THR4 assigned to the task TSK4 is added to the tail end of the execution queue 134 at the timing immediately after input of the task TSK7. In this case, the ticket number "6" is added to the thread THR4.

With such processing, a ticket number representing a correct order of the execution is added to each of the tasks in the task queue 131 and the threads in the execution queue 134 that are assigned to the tasks. The "correct order of execution" as said herein denotes that chronological order matches for the timing of inputting the tasks to the thread pool 121 or the timing of the yield occurrence or the recovery from the standby state.

Figure 8:
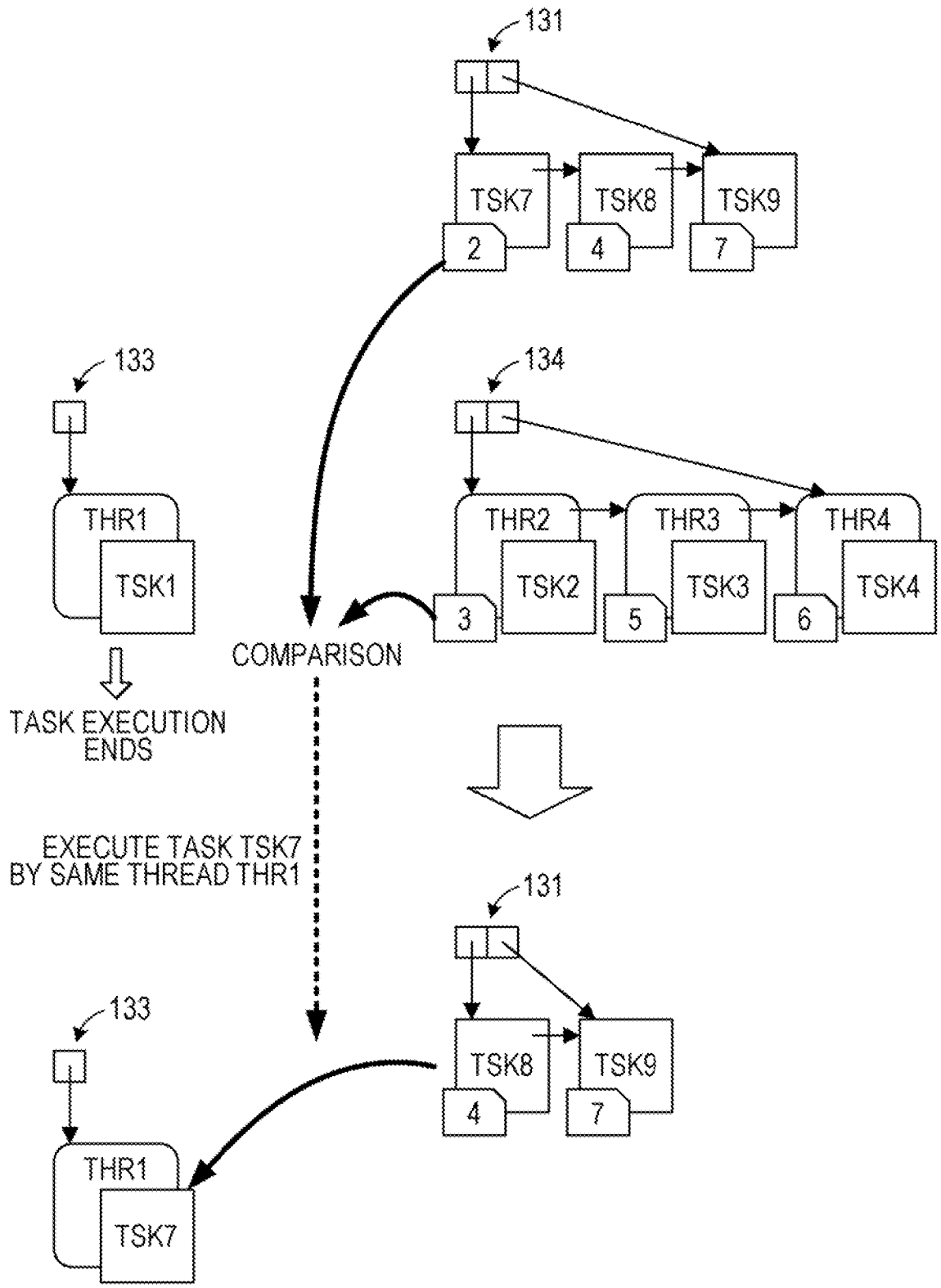
FIG. 8 is a first diagram illustrating execution control of the threads.

FIG. 8 is a first diagram illustrating execution control of the threads. In FIG. 8, suppose that the task TSK1 is being executed by the thread THR1. Then, suppose that execution of the task TSK1 ends without occurrence of the yield or the standby. At this time, a comparison is made between a ticket number "2" added to the leading task TSK7 of the task queue 131 and a ticket number "3" added to the leading thread THR2 of the execution queue 134. Based on this comparison, it is judged which of the task TSK7 or the task TSK2 to which the thread THR2 is assigned is to be executed first.

In an example of FIG. 8, since the ticket number "2" added to the task TSK7 is smaller, it is judged that the task TSK7 is to be executed first. In this case, the task TSK7 is retrieved from the task queue 131, and the thread THR1 that finishes execution of the task TSK1 is assigned to the task TSK7. Then, the thread THR1 is used without any change and the task TSK7 is executed. In this case, since different tasks are continuously executed by the same current thread, neither switching of the threads nor the context switch accompanying the switching occurs.

Figure 9:
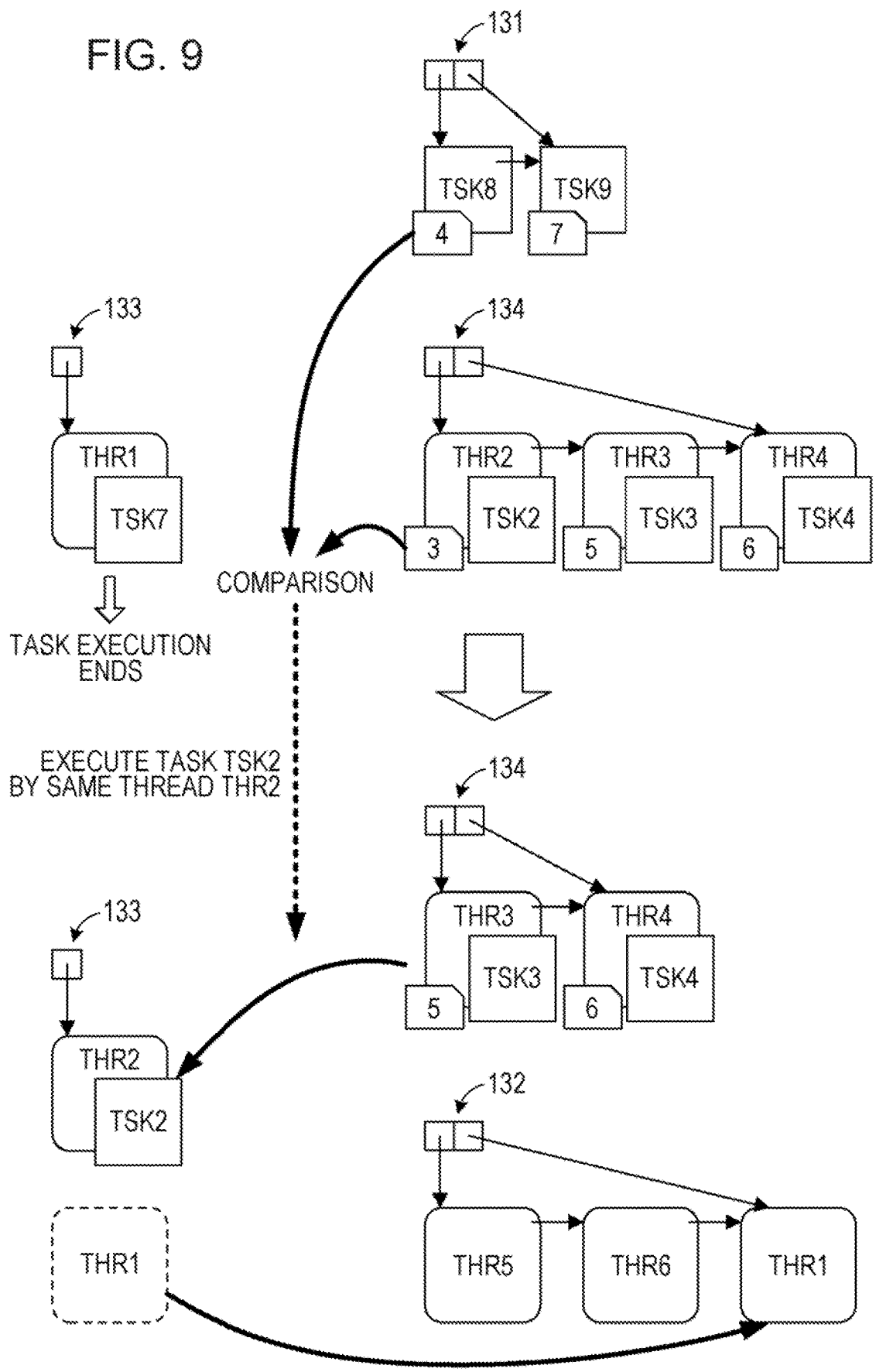
FIG. 9 is a second diagram illustrating the execution control of the threads.

FIG. 9 is a second diagram illustrating the execution control of the threads. In FIG. 9, suppose that the task TSK7 is being executed by the thread THR1 with the procedure of FIG. 8. Then, suppose that execution of the task TSK7 ends without occurrence of the yield or the standby. At this time, a comparison is made between a ticket number "4" added to the leading task TSK8 of the task queue 131 and a ticket number "3" added to the leading thread THR2 of the execution queue 134. Based on this comparison, it is judged which of the task TSK8 or the task TSK2 to which the thread THR2 is assigned is to be executed first.

In an example of FIG. 9, since the ticket number "3" added to the thread THR2 is smaller, it is judged that the thread THR2 is to be executed first. In this case, the thread THR1, which is the current thread, is added to the idle thread queue 132 and returned to the idle queues. Then, the thread THR2 is retrieved from the execution queue 134. This thread THR2 becomes the current thread, and the task TSK2 is executed.

Figure 10:
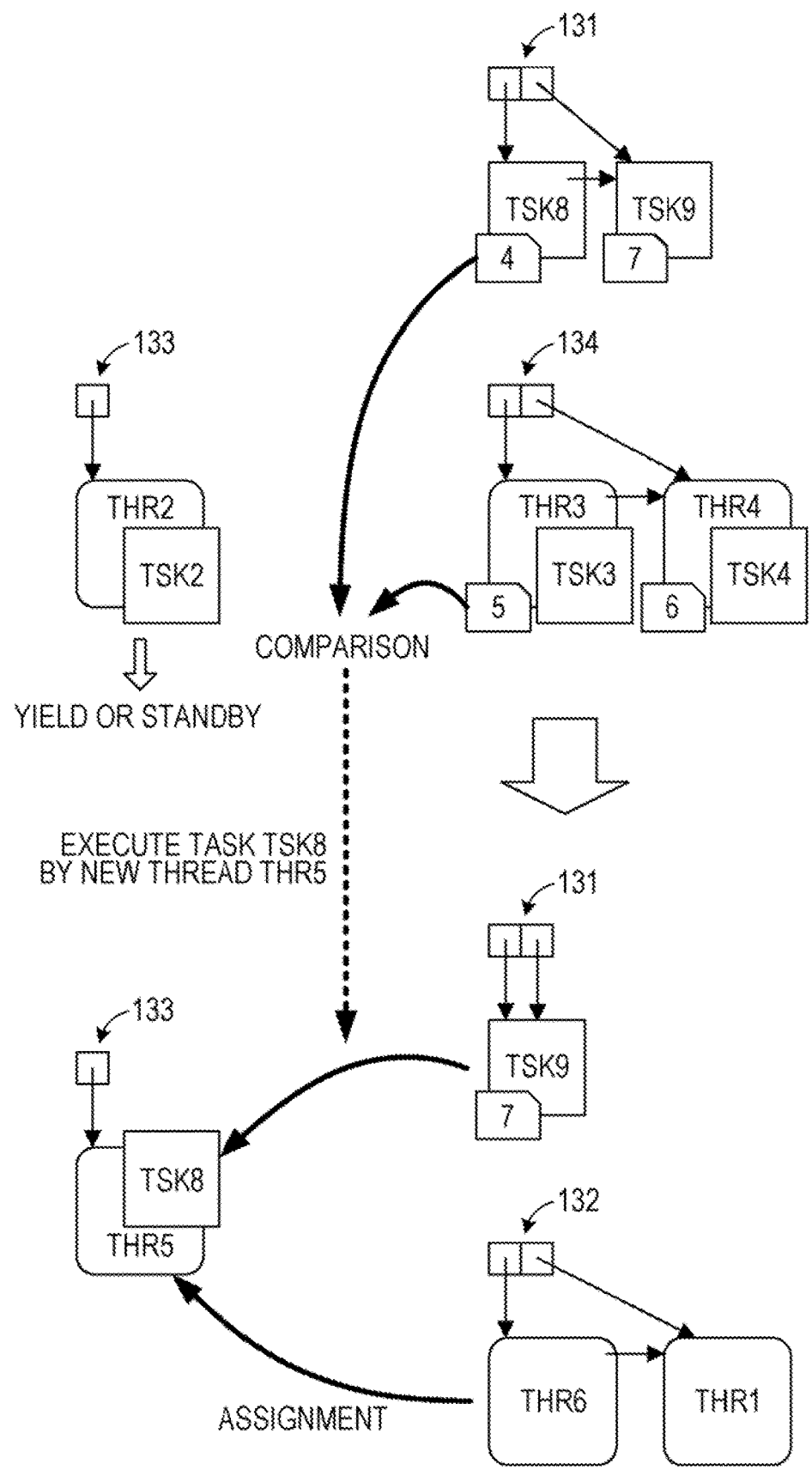
FIG. 10 is a third diagram illustrating the execution control of the threads.

FIG. 10 is a third diagram illustrating the execution control of the threads. In FIG. 10, suppose that the task TSK2 is being executed by the thread THR2 with the procedure of FIG. 9. Then, suppose the yield or the standby of the thread THR2 occurs. At this time, a comparison is made between a ticket number "4" added to the leading task TSK8 of the task queue 131 and a ticket number "5" added to the leading thread THR3 of the execution queue 134. Based on this comparison, it is judged which of the task TSK8 or the task TSK3 to which the thread THR3 is assigned is to be executed first.

In an example of FIG. 10, since the ticket number "4" added to the task TSK8 is smaller, it is judged that the task TSK8 is to be executed first. In this case, the thread THR2, which is the current thread, enters a suspend state. In a case of the yield occurrence, the thread THR2 is added to the tail end of the execution queue 134. In a case where the standby occurs, the thread THR2 comes under the control of the standby management data 135. In addition, the task TSK8 is retrieved from the task queue 131, the idle thread (here, the thread THR5) is retrieved from the idle thread queue 132, and the thread THR5 is assigned to the task TSK8. Then, the thread THR5 becomes the current thread, and the task TSK8 is executed.

With the processing illustrated in the aforementioned FIGS. 7 to 10, only the threads already assigned to the tasks are registered in the execution queue 134, and to a new task registered in the task queue 131, a thread is assigned in a stage where that task is executed. Time taken to assign the thread to the task does not change, in whichever stage of the task input to start of the task execution the assignment of the thread is performed. Therefore, the assignment of the thread in the task execution stage makes it possible to suppress as many number of occurrences of new worker threads as possible, without increasing the processing load of the assignment of the thread. As a result, the number of simultaneous occurrences of the worker threads may be decreased.

In addition, as in the case of FIG. 8, if the task to be executed is released from the current thread, the task in the task queue 131 is executed using the same current thread. In this manner, provision of a mechanism of continuously executing a plurality of tasks with one thread may further decrease the number of the simultaneous occurrences of the worker threads.

The decrease in the number of the simultaneous occurrences of the worker threads indirectly contributes to the decrease in the number of the occurrences of the context switches in the sense that the number of the switches of the threads to be executed increases just for the large number of the worker threads. In addition, in the case of FIG. 8, since the tasks may be continuously executed without switching the threads, the processing of FIG. 8 directly contributes to the decrease in the number of the occurrences of the context switches. In any case, the decrease in the number of the occurrences of the context switches may reduce the overhead due to the occurrences. As a result, the I/O processing performance in the storage control may be improved.

In addition, with the processing illustrated in FIGS. 7 to 10, a ticket number representing the execution priority is added to the task to be added to the task queue 131 and a thread to be added to the execution queue 134. Then, the ticket numbers are compared between the leading task in the task queue 131 and the leading thread in the execution queue 134. Based on a result of the comparison, it is judged which of the leading task and a task to which the leading thread is assigned is to be executed first. Such a mechanism may normalize the order of the task execution. That is, the order of the task execution may be controlled so that the preceding-following relationship between the input time of the new task to the thread pool 121 and the time when the task to which the thread is assigned is added to the execution queue 134 is observed.

In particular, in the case of FIG. 8, the task in the task queue 131 with the higher execution priority than the task to which the thread in the execution queue 134 is assigned may be executed first, and that task may be continuously executed by the existing current thread. Therefore, the assignment of the ticket number to the task or the thread and the comparison of the ticket numbers of the leading task in the task queue 131 and the leading thread in the execution queue 134 contribute to both of the normalization of the order of the task execution and the decrease in the number of the occurrences of the context switches.

Figure 11:
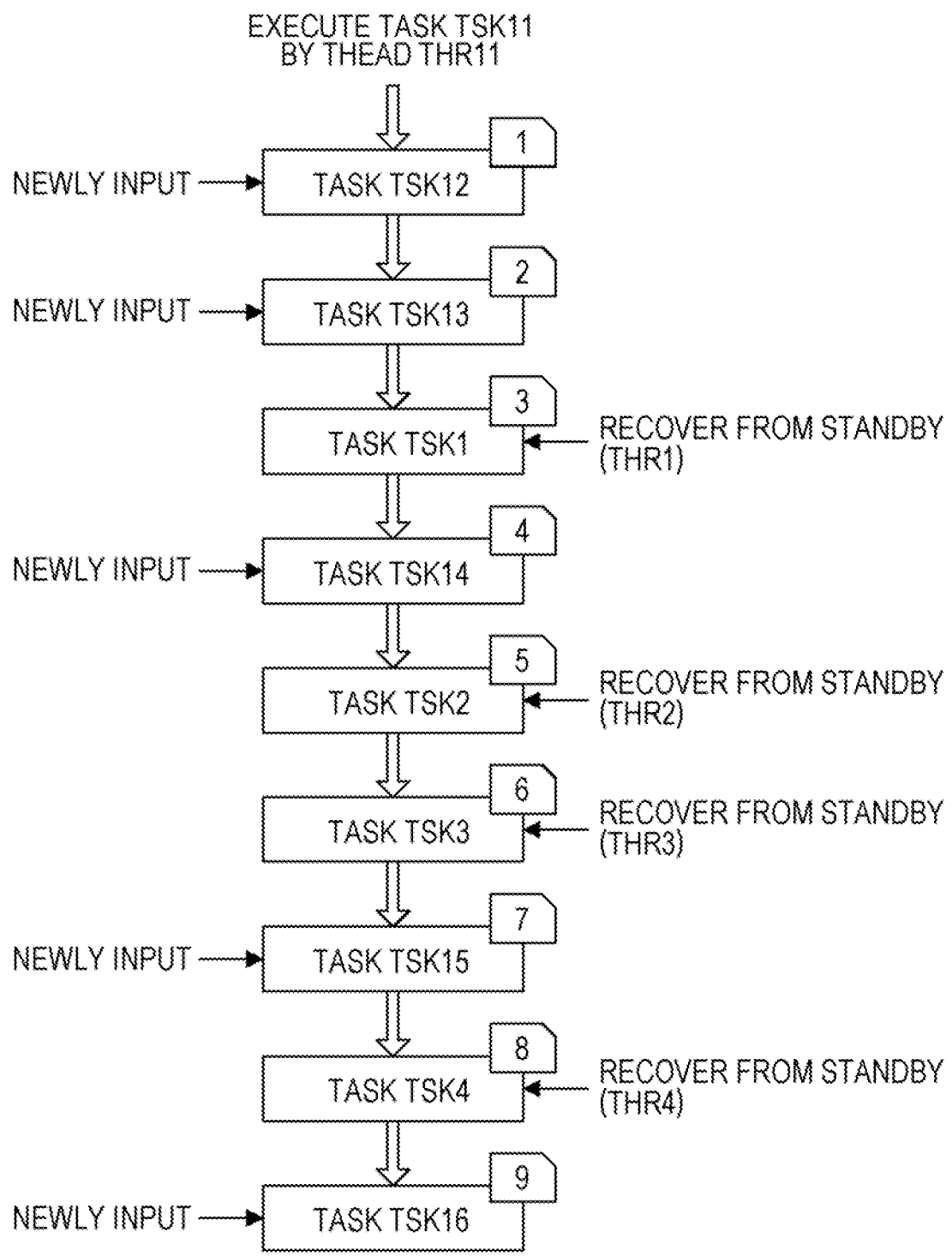
FIG. 11 is a diagram illustrating order of occurrence of the tasks.

Here, a specific example of the normalization of the order of the task execution is presented. FIG. 11 is a diagram illustrating an example of order of occurrence of the tasks. In an example of FIG. 11, from a state in which a task TSK11 is being executed by the thread THR11, new tasks TSK12 and TSK13 are inputted in sequence to the thread pool 121. Then, the thread THR1 assigned to the task TSK1 recovers from the standby state. Then, a new task TSK14 is inputted to the thread pool 121. Then, the thread THR2 assigned to the task TSK2 recovers from the standby state, and furthermore, the thread THR3 assigned to the task TSK3 recovers from the standby state. Then, a new task TSK15 is inputted to the thread pool 121. Then, the thread THR4 assigned to the task TSK4 recovers from the standby state. Then, a new task TSK16 is inputted to the thread pool 121.

Note that in the storage controller 100 of the second embodiment, the ticket numbers "1" to "9" are issued according to the aforementioned order of the occurrence of the tasks. In FIG. 11, the ticket numbers "3", "5", "6", and "8" assigned to the tasks TSK1 to TSK4 are in fact added to the threads THR1 to THR4.

FIG. 12 is a diagram illustrating an example of the task execution control by the comparative example. This FIG. 12 illustrates a case where the task execution of FIG. 11 is controlled by the processing of the comparative example illustrated in FIG. 6. Note that in the processing of the comparative example, the ticket numbers depicted in FIG. 11 are not added. In addition, if a task is inputted to the thread pool 121, a thread is assigned to that task after the task is once registered in the task queue 131. In description of FIG. 12, however, registration to the task queue 131 is omitted.

Suppose that in an initial state of FIG. 12, the task TSK11 is being executed by the thread THR11 and the number of the idle threads registered in the idle thread queue 132 is "3". If the task TSK12 is inputted to the thread pool 121 from this state, the thread THR12 is assigned to the task TSK12 from the idle thread queue 132, and the thread THR12 is added to the execution queue 134. At this time, the number of the idle threads decreases to "2" (state ST11).

Then, if the task TSK13 is inputted to the thread pool 121, the thread THR13 is assigned to the task TSK13 from the idle thread queue 132, and the thread THR13 is added to the execution queue 134. At this time, the number of the idle threads decreases to "1" (state ST12). Then, if the thread THR1 assigned to the task TSK1 recovers from the standby state, the thread THR1 is added to the execution queue 134 (state ST13).

Then, if the task TSK14 is inputted to the thread pool 121, a thread THR14 is assigned to the task TSK14 from the idle thread queue 132, and the thread THR14 is added to the execution queue 134. At this time, the number of the idle threads decreases to "0" (state ST14). Then, if the thread THR2 assigned to the task TSK2 recovers from the standby state, the thread THR2 is added to the execution queue 134 (state ST15). Then, if the thread THR3 assigned to the task TSK3 recovers from the standby state, the thread THR3 is added to the execution queue 134 (state ST16).

Then, the task TSK15 is inputted to the thread pool 121 and the task TSK15 is registered in the task queue 131. At this time, however, since there remains no idle thread, a thread may not be assigned to the task TSK15, and the task TSK15 remains registered in the task queue 131 (state ST17). Then, if the thread THR4 assigned to the task TSK4 recovers from the standby state, the thread THR4 is added to the execution queue 134 (state ST18).

Then, the task TSK16 is inputted to the thread pool 121 and the task TSK16 is registered in the task queue 131. At this time, however, since there remains no idle thread, a thread may not be assigned to the task TSK16, and the task TSK16 remains registered in the task queue 131 (state ST19).

Then, suppose that the execution of the task TSK11 by the thread THR11 ends. As the task TSK11 ends, the thread THR11 becomes unwanted. The thread THR11 is registered in the idle thread queue 132 and becomes the idle thread. This increases the number of the idle threads to "1" and allows for assignment of a thread to the task TSK15 in the task queue 131. Therefore, the task TSK15 is retrieved from the task queue 131, the thread THR11 is assigned to the task TSK15 from the idle thread queue 132, and the thread THR11 is added to the execution queue 134. At this time, the number of the idle threads is "0" again. In addition, the thread THR12 is retrieved from the head of the execution queue 134, and the task TSK12 is executed, by the thread THR12 (state ST20).

Then, suppose that the yield occurs in the thread THR12 that is executing the task TSK12 and the thread THR12 is added to the tail end of the execution queue 134. At this time, the thread THR13 is retrieved from the head of the execution queue 134, and the task TSK13 is executed by the thread THR13 (state ST21).

After this, the threads are sequentially retrieved from the execution queue 134 and the tasks are executed by the retrieved threads. Therefore, the tasks are executed in order of TSK1, TSK14, TSK2, TSK3, TSK4, TSK15, and TSK12. As compared to the task order in FIG. 11, the task TSK15 and the task TSK4 switch places in the order. Thus, it is seen that the tasks are not executed correct order. In addition, since no thread is assigned to the task TSK16 in the state ST21 of FIG. 12, the task TSK12, to which the thread THR12 that yields after input of the task TSK16 is assigned, is executed in advance of the task TSK16.

FIG. 12 as above illustrates by an example that as depletion of the idle threads disables assignment of the thread to the new task, the order of the task execution changes. As another example, however, due to the time taken for the process to assign the thread to the new task, the order of the task execution may change. For example, suppose that after a task is inputted and the process to assign the thread is started, another thread recovers from the standby state. At this time, if the thread that recovers before the process to assign the thread is complete is added to the execution queue 134, the order of the task execution changes.

FIGS. 13 and 14 are each a diagram illustrating an example of the task execution control by the second embodiment. FIGS. 13 and 14 illustrate a case where the execution of the task of FIG. 11 is controlled in the storage controller 100 of the second embodiment.

Suppose that in an initial state of FIG. 1, similarly to the initial state of FIG. 12, the task TSK11 is being executed by the thread THR11 and the number of the idle threads registered in the idle thread queue 132 is "3". If the task TSK12 is inputted to the thread pool 131 from this state, the task TSK12 is added to the task queue 131 and the ticket number "1" is added to the task TSK12 (state ST31). Then, if the task TSK13 is inputted to the thread pool 121, the task TSK13 is added to the task queue 131 and the ticket number "2" is added to the task TSK13 (state ST32).

Then, if the thread THR1 assigned to the task TSK1 recovers from the standby state, the thread THR1 is added to the execution queue 134, and the ticket number "3" is added to the thread THR1 (state ST33). Then, if the task TSK14 is inputted to the thread pool 121, the task TSK14 is added to the task queue 131 and the ticket number "4" is added to the task TSK14 (state ST34).

Then, if the thread THR2 assigned to the task TSK2 recovers from the standby state, the thread THR2 is added to the execution queue 134, and the ticket number "5" is added to the thread THR2 (state ST35). Then, if the thread THR3 assigned to the task TSK3 recovers from the standby state, the thread THR3 is added to the execution queue 134, and the ticket number "6" is added to the thread THR3 (state ST36).

Then, if the task TSK15 is inputted to the thread pool 121, the task TSK15 is added to the task queue 131 and the ticket number "7" is added to the task TSK15 (state ST37). Then, if the thread THR4 assigned to the task TSK4 recovers from the standby state, the thread THR4 is added to the execution queue 134, and the ticket number "8" is added to the thread THR4 (state ST38). Then, if the task TSK16 is inputted to the thread pool 121, the task TSK16 is added to the task queue 131 and the ticket number "9" is added to the task TSK16 (state ST39).

Then, suppose that execution of the task TSK11 by the thread THR11 ends, and the thread THR11 becomes unwanted. At this time, a comparison is made between the ticket number "1" added to the leading task TSK12 of the task queue 131 and the ticket number "3" added to the leading thread THR1 of the execution queue 134. In this example, since the ticket number "1" added to the task TSK12 is smaller, it is judged that the task TSK12 is to be executed first. In this case, the task TSK12 is retrieved from the task queue 131, the thread THR11 that finishes the execution of the task TSK11 is assigned to the task TSK12, and the task TSK12 is executed using the thread THR11 as it is (state ST40). Since the two tasks are continuously executed by the same current thread, neither switching of the threads nor the context switch accompanying the switching occurs.

Then, suppose that the yield occurs in the thread THR11 that is executing the task TSK12 and the thread THR11 is added to the tail end of the execution queue 134. The ticket number "10" is added to the thread THR11. At this time, a comparison is made between the ticket number "2" added to the leading task TSK13 of the task queue 131 and the ticket number "3" added to the leading thread THR1 of the execution queue 134. In this example, since the ticket number "2" added to the task TSK13 is smaller, it is judged that the task TSK13 is to be executed first. In this case, the task TSK13 is retrieved from the task queue 131, and the idle thread (here, the thread THR12) is retrieved from the idle thread queue 132. Then, the thread THR12 is assigned to the task TSK13, and the task TSK13 is executed by the thread THR12. At this time, the number of the idle threads decreases to "2" (state ST41).

Hereinafter, the description continues with reference to FIG. 14. Then, suppose that execution of the task TSK13 by the thread THR12 ends, and the thread THR12 becomes unwanted. At this time, a comparison is made between the ticket number "4" added to the leading task TSK14 of the task queue 131 and the ticket number "3" added to the leading thread THR1 of the execution queue 134. In this example, since the ticket number "3" added to the thread THR1 is smaller, it is judged that the thread THR1 is to be executed first. In this case, the thread THR12 is added to the idle thread queue 132 and returned to the idle queues. This increases the number of the idle threads to "3". In addition, the thread THR1 is retrieved from the execution queue 134, and the task TSK1 is executed by the thread THR1 (state ST42).

Then, suppose that the yield occurs in the thread THR1 that is executing the task TSK1, and the thread THR1 is added to the tail end of the execution queue 134. At this time, a comparison is made between the ticket number "4" added to the leading task TSK14 of the task queue 131 and the ticket number "5" added to the leading thread THR2 of the execution queue 134. In this example, the ticket number "4" added to the task TSK14 is smaller. In this case, the task TSK14 is retrieved from the task queue 131, the idle thread (here, the thread THR13) is retrieved from the idle thread queue 132, and the task TSK14 is executed by the thread THR13. At this time, the number of the idle threads decreases to "2" (state ST43).

Then, suppose that the yield occurs in the thread THR13 that is executing the task TSK14 and the thread THR13 is added to the tail end of the execution queue 134. At this time, a comparison is made between the ticket number "7" added to the leading task TSK15 of the task queue 131, and the ticket number "5" added to the leading thread THR2 of the execution queue 134. In this example, the ticket number "5" added to the thread THR2 is smaller. In this case, the thread THR2 is retrieved from the execution queue 134, and the task TSK2 is executed by the thread THR2 (state ST44).

Then, suppose that the yield occurs in the thread THR2 that is executing the task TSK2, and the thread THR2 is added to the tail end of the execution queue 134. At this time, a comparison is made between the ticket number "7" added to the leading task TSK15 of the task queue 131 and the ticket number "6" added to the leading thread THR3 of the execution queue 134. In this example, the ticket number "6" added to the thread THR3 is smaller. In this case, the thread THR3 is retrieved from the execution queue 134, and the task TSK3 is executed by the thread THR3 (state ST45).

Then, suppose that the yield occurs in the thread THR3 that is executing the task TSK3, and the thread THR3 is added to the tail end of the execution queue 134 (not illustrated). At this time, a comparison is made between the ticket number "7" added to the leading task TSK15 of the task queue 131 and the ticket number "8" added to the leading thread THR4 of the execution queue 134. In this example, the ticket number "7" added to the task TSK15 is smaller. In this case, the task TSK15 is retrieved from the task queue 131, the idle thread (here, the thread THR14) is retrieved from the idle thread queue 132, and the task TSK15 is executed by the thread THR14. At this time, the number of the idle threads decreases to "1" (state ST46).

Suppose that the yield occurs in the thread THR14 that is executing the task TSK15, and the thread THR14 is added to the tail end of the execution queue 134 (not illustrated). At this time, a comparison is made between the ticket number "9" added to the leading task TSK16 of the task queue 131 and the ticket number "8" added to the leading thread THR4 of the execution queue 134. In this example, the ticket number "8" added to the thread THR4 is smaller. In this case, the thread THR4 is retrieved from the execution queue 134, and the task TSK4 is executed by the thread THR4 (state ST47).

With the processing of FIGS. 13 and 14 as above, the tasks are executed in the same order as the order illustrated in FIG. 11. In particular, although the tasks TSK15 and TSK4 switch the places in the order of the execution in the processing of FIG. 12, the order of the execution of these tasks is not changed in FIG. 14. In addition, after the state ST47 of FIG. 14, the task TSK16 is executed in advance according to the comparison of the ticket number "9" of the task TSK16 and the ticket number "10" of the thread THR11. Therefore, even in this respect, the order of the task execution is improved from the processing of FIG. 12. In this manner, according to the storage controller 100 of the present embodiment, the order of the task execution may be normalized.

Furthermore, as compared with the processing of FIG. 12, since the processing of FIGS. 13 and 14 decreases the number of the idle threads to be assigned to the tasks, the number of the threads to be used simultaneously (the number of simultaneous occurrences of the worker threads) may be decreased. This is because there are some cases where a thread is assigned to a newly inputted task in an execution stage and during the stage, an existing current thread is assigned, which makes it possible to execute the task by that current thread. For example, in the state ST40 of FIG. 13, the same thread THR11 is continuously executing the tasks TSK11 and TSK12. This may decrease the number of the thread switches. As a result, the number of the occurrences of the context switches is decreased, thus making it possible to suppress the overhead due to the occurrences. Therefore, the I/O processing performance of the storage controller 100 may be improved.

The processing of the storage controller 100 will now be described by using a flowchart.

Figure 15:
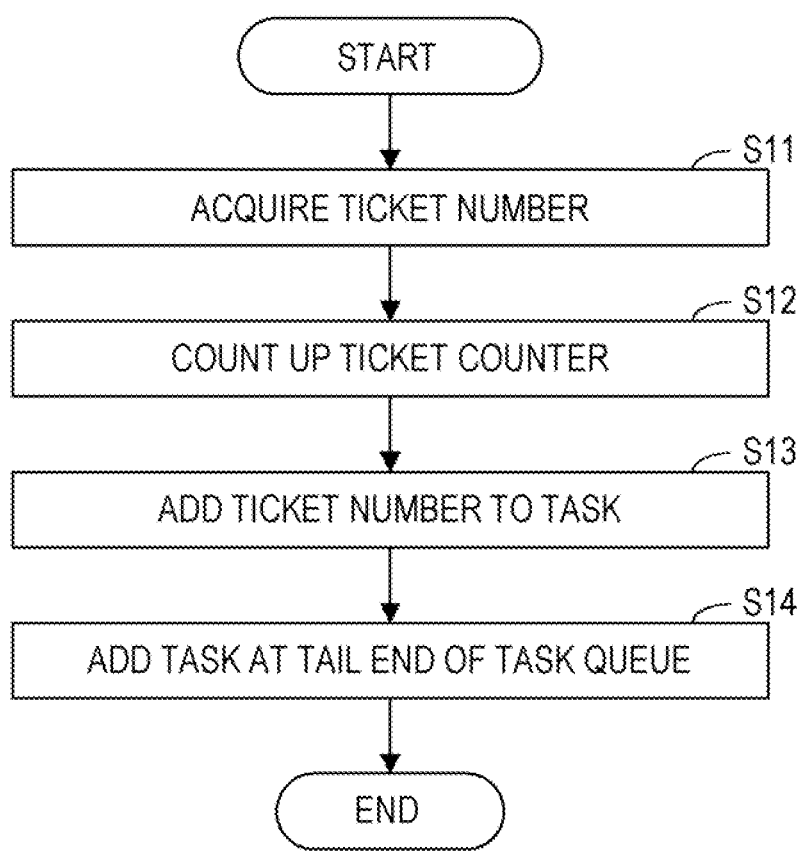
FIG. 15 is an example of a flowchart illustrating a procedure of a task input process.

First, FIG. 15 is an example of a flowchart illustrating a procedure of a task input process. The processing of FIG. 15 starts when a new task is inputted to the thread pool 121.

[Step S11] The thread pool 121 acquires a ticket number from the ticket counter 123.

[Step S12] The thread pool 121 counts up the ticket counter 123.

[Step S13] The thread pool 121 adds the acquired ticket number to an inputted task.

[Step S14] The thread pool 121 adds the task, to which the ticket number is added, to the tail end of the task queue 131.

Figure 16:
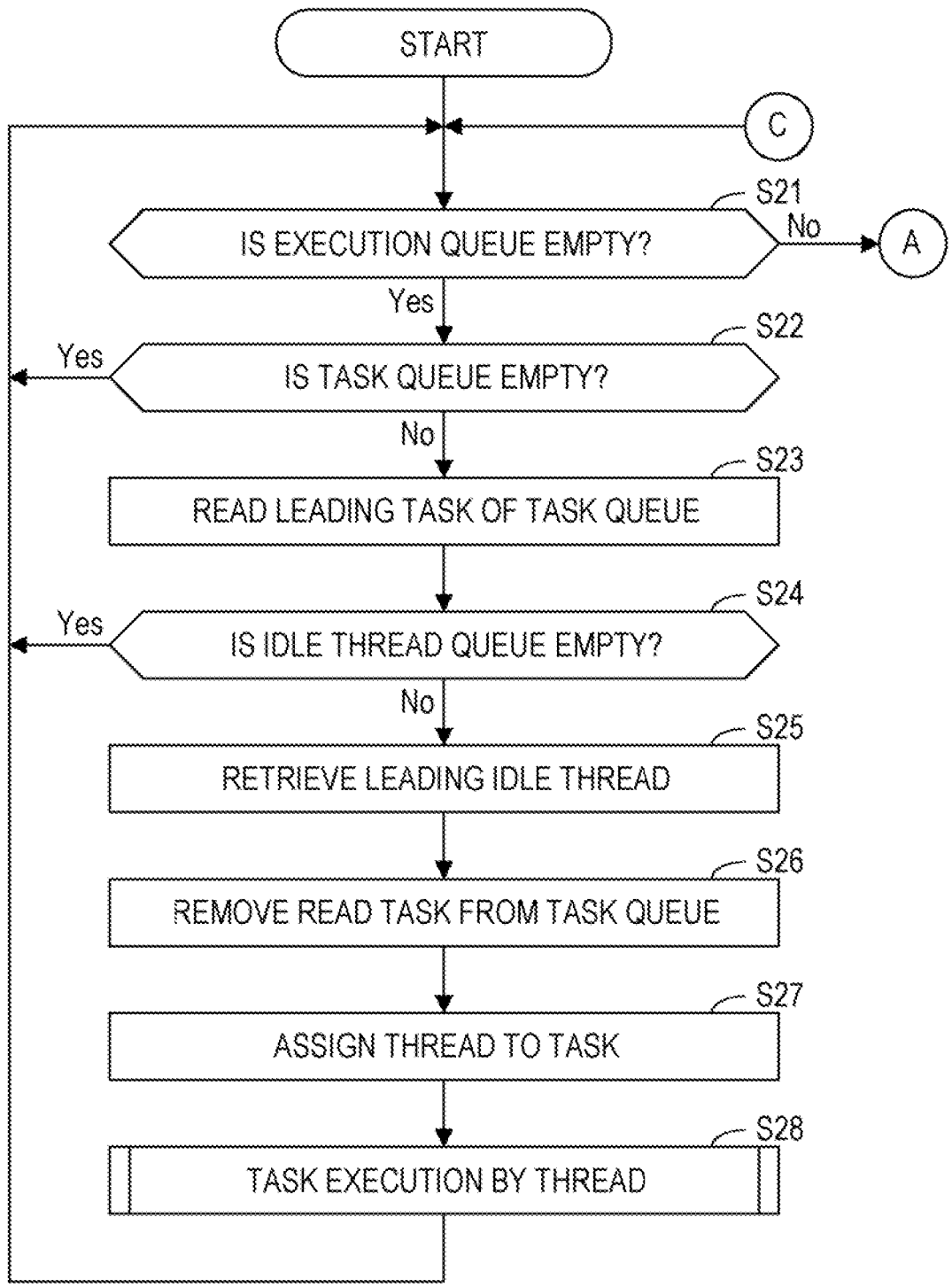
FIG. 16 is a (first) example chart illustrating procedure of a thread scheduling process.
Figure 17:
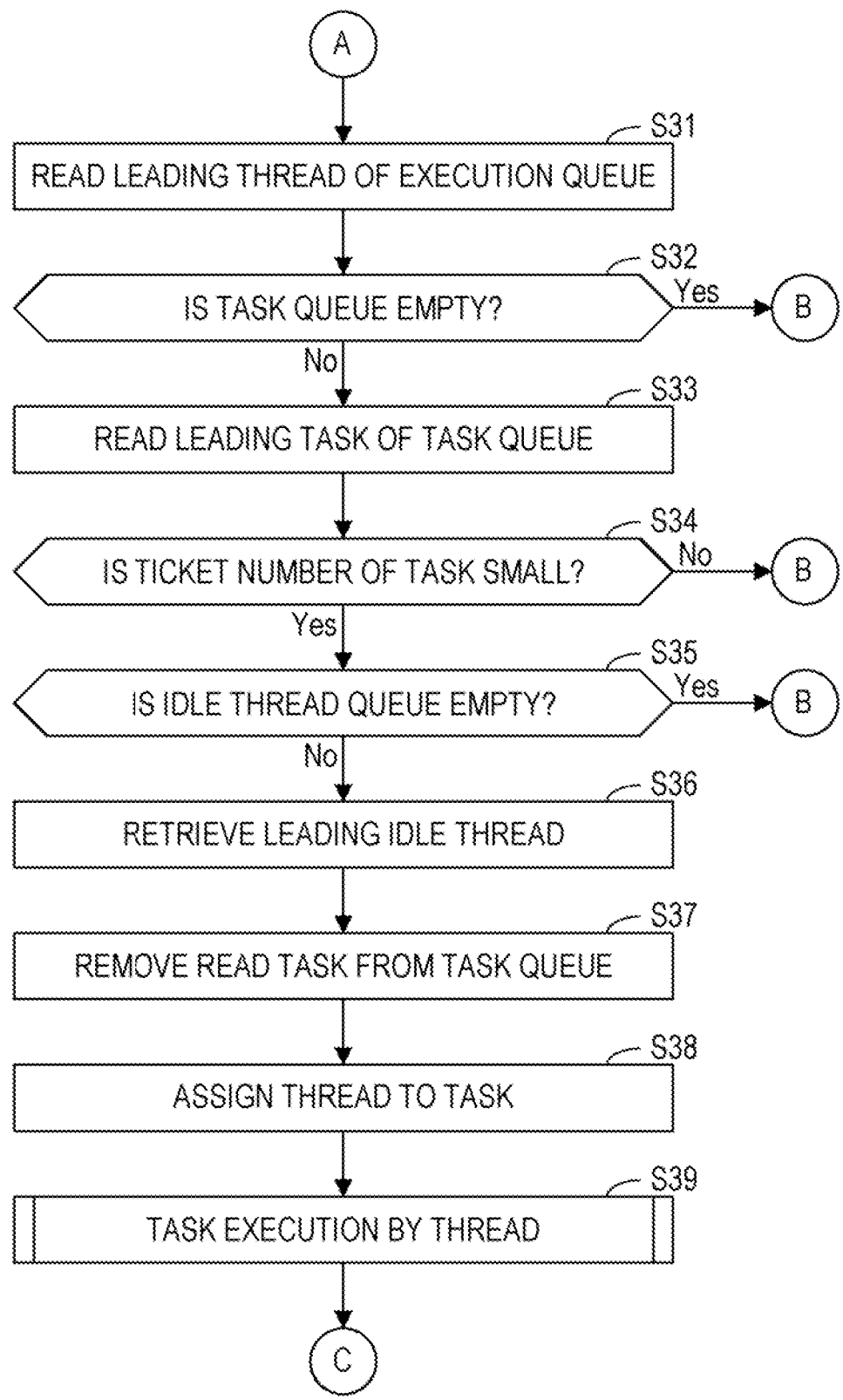
FIG. 17 is a (second) example of a flowchart illustrating the procedure of the thread scheduling process.
Figure 18:
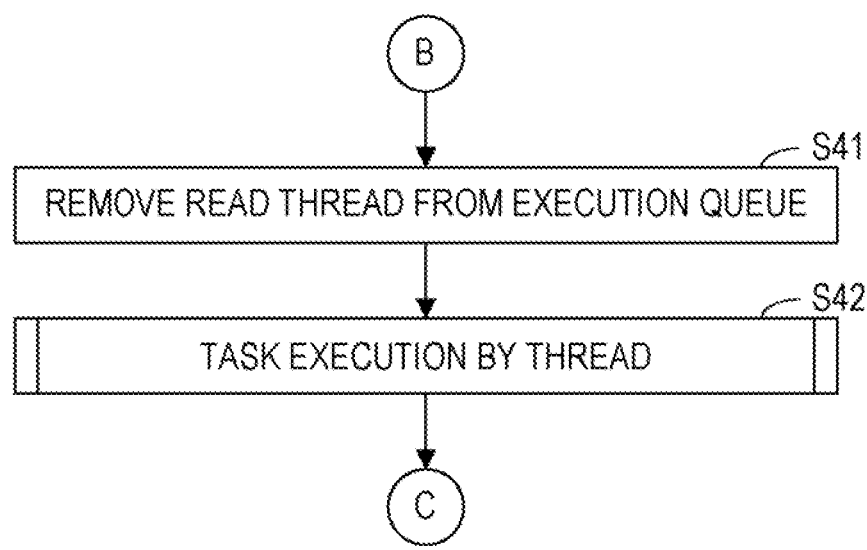
FIG. 18 is a (third) example of a flowchart illustrating the procedure of the thread scheduling process.

FIGS. 16 to 18 are each an example of a flowchart illustrating a procedure of a thread scheduling process.

[Step S21] The thread scheduler 122 judges whether the execution queue 134 is empty. If the execution queue 134 is empty, the thread scheduler 122 performs the processing of step S22. If a thread is registered in the execution queue 134, the thread scheduler 122 performs the processing of step S31 of FIG. 17.

[Step S22] The thread scheduler 122 inquires at the thread pool 121 about whether the task queue 131 is empty. Based on a reply from the thread pool 121, the thread scheduler 122 performs the processing of step S21 if the task queue 131 is empty, and performs the processing of step S23 if the task is registered in the task queue 131.

[Step S23] The thread scheduler 122 reads a leading task of the task queue 131 through the thread pool 121. Specifically, information on tasks such as a pointer representing a function or a function argument, or the like is read out.

[Step S24] The thread scheduler 122 inquires at the thread pool 121 about whether the idle thread queue 132 is empty. Based on a reply from the thread pool 121, the thread scheduler 122 performs the processing of step S21 if the idle thread queue 132 is empty, and performs the processing of step S25 if an idle thread is registered in the idle thread queue 132.

[Step S25] The thread scheduler 122 retrieves a leading idle thread from the idle thread queue 132 through the thread pool 121.

[Step S26] The thread scheduler 122 requests the thread pool 121 to remove, from the task queue 131, the task that is read out in step S23. This retrieves (removes) the corresponding task from the task queue 131.

[Step S27] The thread scheduler 122 assigns the thread retrieved in step S25 to the task that is read out in step S23. Specifically, to the thread, a function pointer or the function argument represented by the task is passed as an argument of that thread.

[Step S28] The control passes to the thread (a CPU resource is yielded), and the task is executed by the thread. Subsequently, when the control returns to the thread scheduler 122, the thread scheduler 122 performs the processing of step S21.

In the processing of FIG. 16 as above, if the execution queue 134 is empty and the task is registered in the task queue 131, an idle thread is assigned to the task retrieved from the task queue 131 and the task is executed by this thread.

Hereinafter, the description continues with reference to FIG. 17.

[Step S31] The thread scheduler 122 reads out the leading thread of the execution queue 134. Specifically, the thread argument (including the function pointer or the function argument represented by the task) or the ticket number assigned to the thread is read out.

[Step S32] The thread scheduler 122 inquires at the thread pool 121 about whether the task queue 131 is empty. Based on a reply from the thread pool 121, the thread scheduler 122 performs the processing of step S41 of FIG. 18 if the task queue 131 is empty, and performs the processing of step S33 if the task is registered in the task queue 131.

[Step S33] The thread scheduler 122 reads out the leading task of the task queue 131 through the thread pool 121. Specifically, the information on the tasks such as the pointer representing the function or the function argument, the assigned ticket numbers, or the like is read out.

[Step S34] The thread scheduler 122 compares the ticket number of the thread that is read out in step S31 and the ticket number of the task that is read out in step S33. The thread scheduler 122 performs the processing of step S35 if the ticket number of the task is smaller and performs the processing of step S41 of FIG. 18 if the ticket number of the thread is smaller.

[Step S35] The thread scheduler 122 inquires at the thread pool 121 about whether the idle thread queue 132 is empty. Based on a reply from the thread pool 121, the thread scheduler 122 performs the processing of step S41 of FIG. 18 if the idle thread queue 132 is empty, and performs the processing of step S36 if the idle thread is registered in the idle thread queue 132.

[Step S36] The thread scheduler 122 retrieves the leading idle thread from the idle thread queue 132 through the thread pool 121.

[Step S37] The thread scheduler 122 requests the thread pool 121 to remove, from the task queue 131, the task that is read out in step S33. This retrieves (removes) the corresponding task from the task queue 131.

[Step S38] The thread scheduler 122 assigns the thread retrieved in step S36 to the task that is read out in step S33. Specifically, to the thread, a function pointer or the function argument represented by the task is passed as an argument of that thread.

[Step S39] The control passes to the thread, and the task is executed by the thread. Subsequently, when the control returns to the thread scheduler 122, the thread scheduler 122 performs the processing of step S21 of FIG. 16.

Hereinafter, the description continues with reference to FIG. 18.

[Step S41] The thread scheduler 122 removes the thread that is read out in step S31 from the execution queue 134.

[Step S42] The control passes to the thread readout in step S31, and the task is executed by this thread. Subsequently, when the control returns to the thread scheduler 122, the thread scheduler 122 performs the processing of step S21 of FIG. 16.

In the aforementioned processing of FIGS. 17 and 18, if neither the task queue 131 nor the execution queue 134 is empty, a comparison is made between the ticket number of the leading task of the task queue 131 and the ticket number of the leading thread of the execution queue 134. If the ticket number of the leading task is smaller and there remains an idle thread, the idle thread is retrieved and the leading task is executed by that thread (step S39). If the ticket number of the leading thread is smaller and if the ticket number of the leading task is smaller but there remains no idle thread, the leading thread is executed (step S42).

Figure 19:
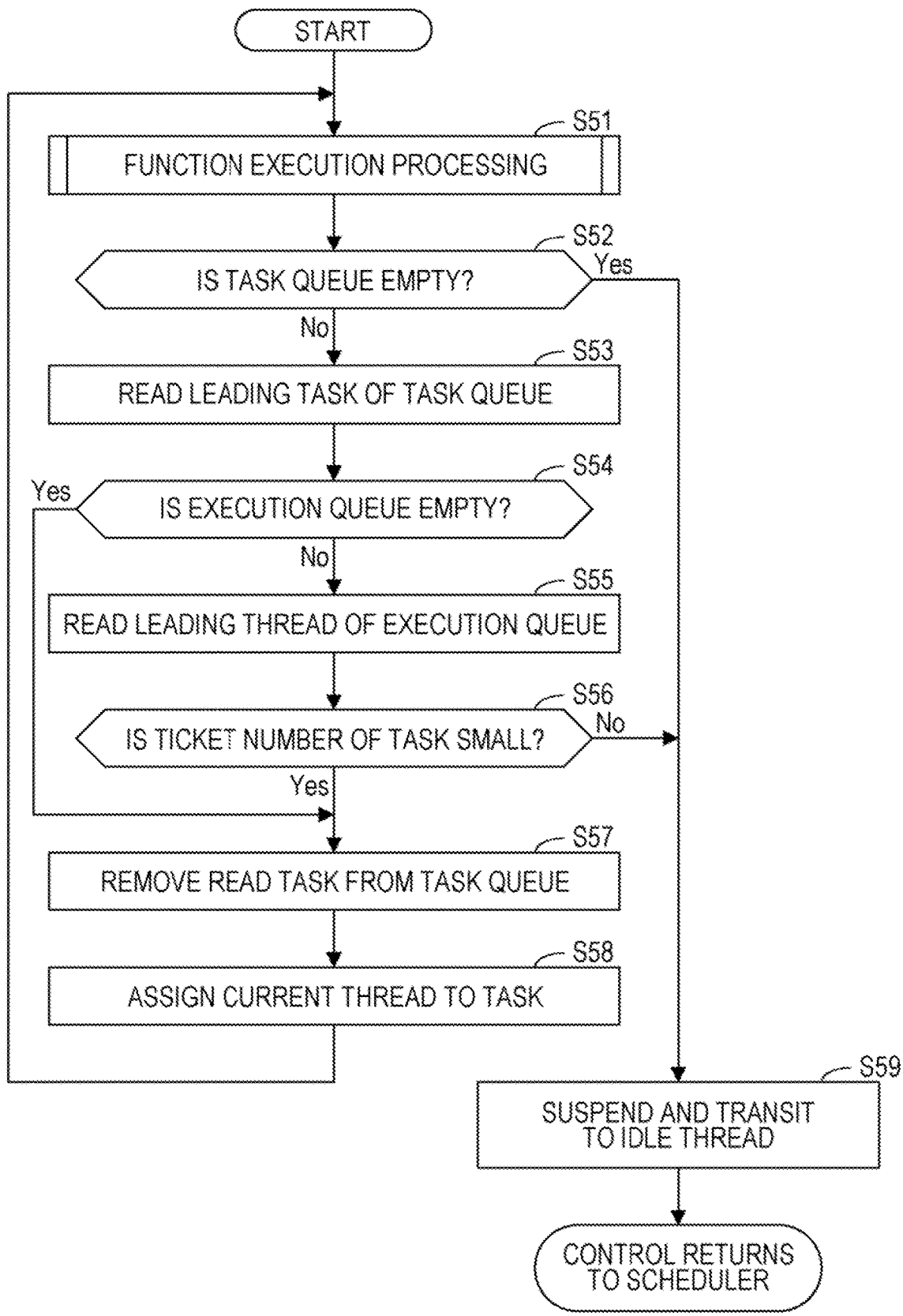
FIG. 19 is an example of a flowchart of a procedure of a task execution process by a thread.

FIG. 19 is an example of a flowchart of a procedure of a task execution process by a thread. Processing of FIG. 19 corresponds to the processing of step S28 of FIG. 16, step S39 of FIG. 17, and step S42 of FIG. 18.

[Step S51] A function execution process by a thread is performed.

Here, a state in which the processing of step S51 ends is a state in which processing included in a task to which a thread is assigned ends and the thread is released. When the processing of step S51 ends, processing of steps S52 to S59 is executed by the released thread. Note that the control is temporarily returned to the thread scheduler 122 at the end of step S51, and the processing of steps S52 to S59 may be executed by the thread scheduler 122.

[Step S52] The thread inquires at the thread pool 121 about whether the task queue 131 is empty. Based on a reply from the thread pool 121, the thread performs the processing of step S59 if the task queue 131 is empty, and performs the processing of step S53 if the task is registered in the task queue 131.

[Step S53] The thread reads out the leading task of the task queue 131 through the thread pool 121. Specifically, the information on the tasks such as the pointer representing the function or the function argument, the assigned ticket numbers, or the like is read out.

[Step S54] The thread judges whether the execution queue 134 is empty. If the execution queue 134 is empty, the thread performs the processing of step S57. If the thread is registered in the execution queue 134, the thread performs the processing of step S55.

[Step S55] The thread reads out the leading thread of the execution queue 134. Specifically, the thread argument or the ticket number assigned to the thread is read out.

[Step S56] The thread compares the ticket number of the task that is read out in step S53 and the ticket number of the thread that is read out in step S55. The thread performs the processing of step S57 if the ticket number of the task is smaller and performs the processing of step S59 if the ticket number of the thread is smaller. In the former case, it is judged that the execution priority of the leading task of the task queue 131 is higher. In the latter case, it is judged that the execution priority of the task to which the leading thread is assigned of the execution queue 134 is higher.

[Step S57] The thread requests the thread pool 121 to remove, from the task queue 131, the task that is read out in step S53. This retrieves (removes) the corresponding task from the task queue 131.

[Step S58] The thread assigns itself (current thread) to the task that is read out in step S53. Specifically, to the thread, a function pointer or the function argument represented by the task is passed as an argument of that thread.

After this, the processing proceeds to step S51, and the function corresponding to the task read out in step S53 is executed by the same thread. More specifically, a plurality of the tasks is continuously executed by the same thread. In this case, no context switch occurs when the task that is read out in step S53 is executed.

[Step S59] The thread suspends and requests the thread pool 121 to register itself in the idle thread queue 132. With this, the thread is added to the tail end of the idle thread queue 132 and transits to the idle threads. After this, the control is returned to the thread scheduler 122, and the processing moves to step S21 of FIG. 16.

Here, if steps S56 and S59 are processed in sequence, it is subsequently judged at step S21 of FIG. 16 that the execution queue 134 is not empty. Furthermore, as steps S31 to S39 of FIG. 17 are executed, the leading thread of the execution queue 134 is executed. On the other hand, if steps S52 and S59 are processed in sequence, the judgment result at step S21 of FIG. 16 is not determined. Then, if it is judged at step S21 that the execution queue 134 is not empty, steps S31 to S39 of FIG. 17 are executed, and thus the leading thread of the execution queue 134 is similarly executed. In any of the cases, the thread suspends in step S59 and another thread is executed in step S39, which thus causes the context switch to occur.

On the other hand, in a case where in step S58, the current thread of the current situation is assigned to the leading task of the task queue 131, and in step S51, the leading task is executed by the current thread, the plurality of the tasks is executed continuously by the same thread. In this case, since no thread switch occurs, the plurality of the tasks may be executed continuously without causing the context switch accompanying the thread switch to occur.

Figure 20:
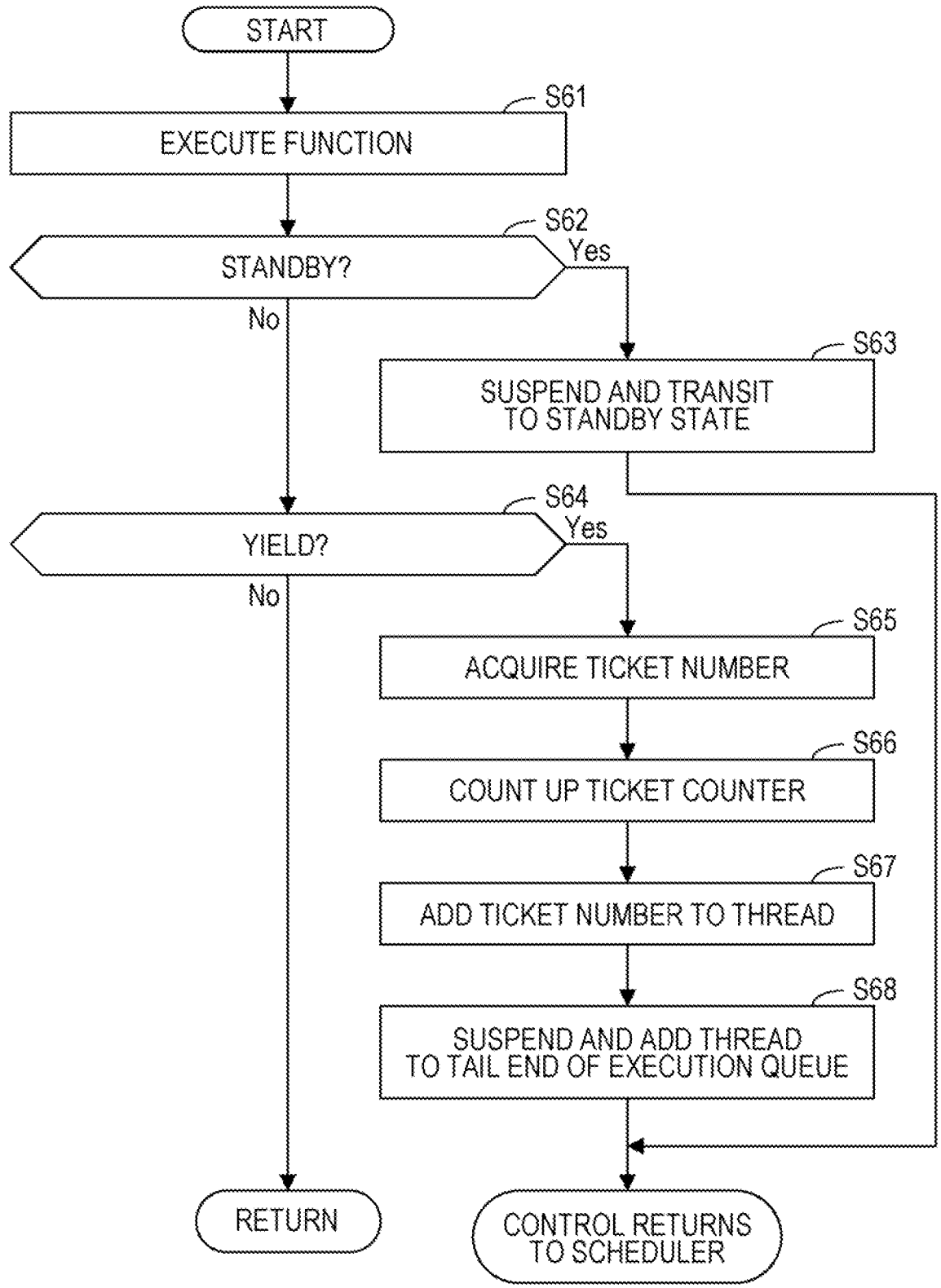
FIG. 20 is an example of a flowchart illustrating a procedure of a function execution process.

FIG. 20 is an example of a flowchart illustrating a procedure of a function execution process. The processing in FIG. 20 corresponds to the processing of step S51 in FIG. 19.

[Step S61] The thread executes the function based on the function pointer and the function argument associated with itself.

[Step S62] When the standby occurs, the processing moves to step S63. [Step S62] When no standby occurs, the processing moves to step S64.

[Step S63] The thread suspends and transits to the standby state by registering information on the thread itself in the standby management data 135. After this, the control is returned to the thread scheduler 122, and the processing moves to step S21 of FIG. 16.

[Step S64] If the yield occurs, processing of the task by the thread halts in the middle, and the processing moves to step S65. If no yield occurs, that is, if the processing of the function in step S61 ends, the function execution process ends, and the processing moves to step S52 of FIG. 19.

[Step S65] The thread acquires a ticket number from the ticket counter 123.

[Step S66] The thread counts up the ticket counter 123.

[Step S67] The thread adds the acquired ticket number to itself.

[Step S68] The thread suspends and adds itself, to which the ticket number is added, to the tail end of the execution queue 134. After this, the control is returned to the thread scheduler 122, and the processing moves to step S21 of FIG. 16.

Here, supplemental description is given of an example of thread standby.

Here, as an example, description is given of standby of a thread assigned to a task that communicates with specific hardware. The following processing is performed with an interface circuit for communicating with the specific hardware. For example, when communications take place with a host server 50 as the specific hardware, the following processing is performed with the host interface 105 for communicating with the host server 50.

A completion queue corresponding to the aforementioned interface circuit is prepared for the RAM 102. The completion queue is a queue in which an entry representing completion of processing requested by the task is registered, when the processing that the task requests the interface circuit to perform completes. In addition, the standby management data 135 includes a standby management queue corresponding to the interface circuit. The standby management queue is a queue in which an entry corresponding to the thread that suspends and enters the standby state is registered. Note that if more than one piece of the specific hardware is present at a destination of the communications, the completion queue and the standby management queue are each prepared for every interface circuit corresponding to each piece of the hardware.

When the thread executes the task that the thread requests the interface circuit to process, the thread confirms whether the entry representing the completion of the requested processing is in the completion queue. When requested by the thread to perform the processing, the interface circuit performs the processing. When the processing completes, the interface circuit stores a completion message in an area over a reception buffer specified by the thread and registers the entry representing the completion of the processing in the completion queue. This entry includes identification information of the thread that makes a request for the processing.

For example, when requested by the thread to receive data from the aforementioned hardware, the interface circuit receives the requested data from the hardware. When receipt of the data is complete, the interface circuit stores the completion message and the received data in the reception buffer and registers, in the completion queue, the entry including the identification information of the thread that makes the request. If the entry including the identification information of the thread itself is not in the completion queue, the thread suspends and enters the standby state by registering the entry representing the thread itself in the standby management queue. The entry of the standby management queue includes the identification information of the thread, as well as the completion message or a storage destination address of the received data in the reception buffer.

In processing of FIG. 20, in step S61, the function for requesting the interface circuit of the processing is executed. Then, if the entry representing the completion of the execution of this function is not registered in the completion queue, "Yes" is judged in step S62, and the thread is registered in the standby management queue in step S63.

On the other hand, the thread scheduler 122 polls the completion queue at the intermittent timing and confirms whether the entry corresponding to the thread registered in the standby management queue is registered in the completion queue. If the corresponding entry is registered in the completion queue, the thread scheduler 122 retrieves the thread corresponding to the entry from the standby management queue and registers that thread at the tail end of the execution queue 134. This recovers the thread from the standby state. When retrieved from the execution queue 134, the thread uses the completion message or the received data over the reception buffer to perform subsequent processing included in the task.

Figure 21:
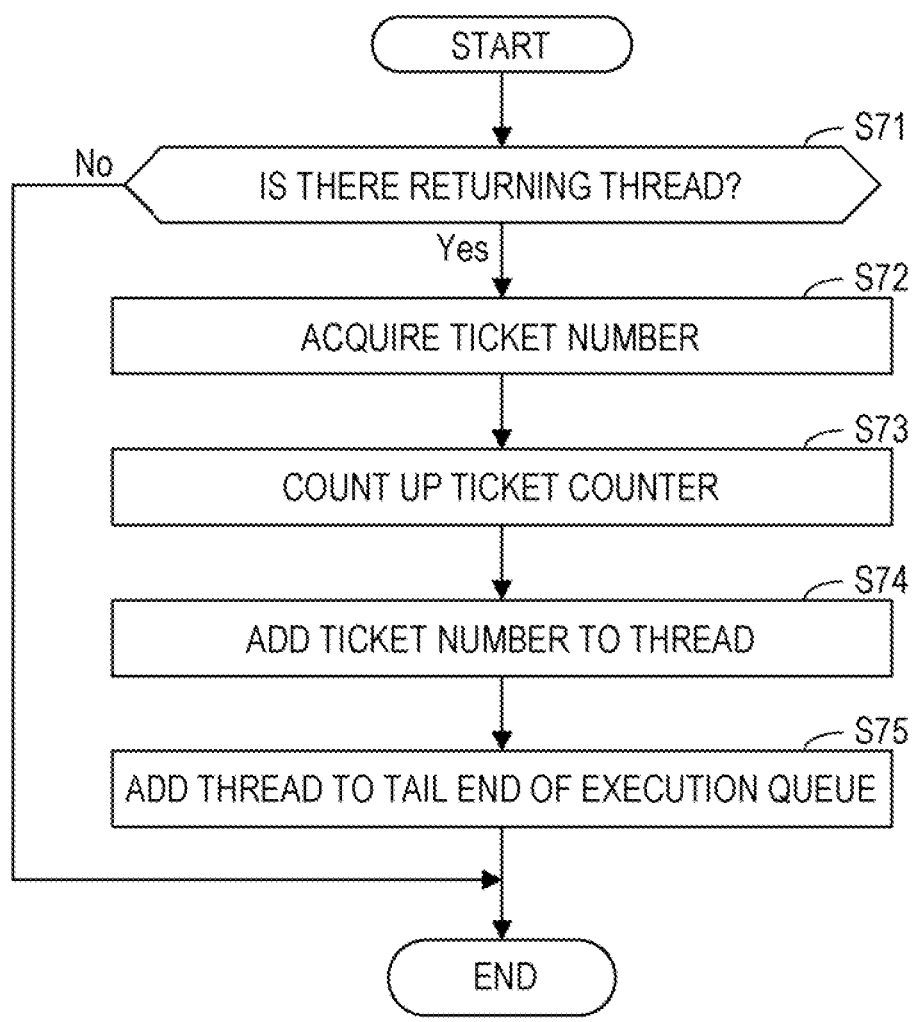
FIG. 21 is an example of a flowchart illustrating a procedure of a thread recovery judgment process by a thread scheduler.

FIG. 21 is an example of a flowchart illustrating a procedure of a thread recovery judgment process by a thread scheduler.

[Step S71] The thread scheduler 122 judges whether there is a thread that recovers, of the threads in the standby state. In the aforementioned standby example, if the thread scheduler 122 polls the completion queue and the entry corresponding to the thread registered in the standby management queue is registered in the completion queue, it is judged that thread is the thread to recover. If there is the thread to recover, the thread scheduler 122 executes processing of step S72 If there is no thread to recover, the thread scheduler 122 finishes the recovery judgment process.

[Step S72] The thread scheduler 122 acquires a ticket number from the ticket counter 123.

[Step S73] The thread scheduler 122 counts up the ticket counter 123.

[Step S74] The thread scheduler 122 retrieves from the standby management data 135 the thread that is judged to recover and adds the acquired ticket number to that thread. In the aforementioned standby example, at this time, the thread judged to recover is retrieved from the standby management queue (removed from the standby management queue).

[Step S75] The thread scheduler 122 adds the thread, to which the ticket number is added, to the tail end of the execution queue 134. This recovers the thread from the standby state.

The recovery judgment process of FIG. 21 is executed at the following timing, for example.

In the multithread control of the non-preemptive type (cooperative type), as an example, a rule is adopted that when the thread execution ends and the control returns to the thread scheduler 122, it is confirmed whether or not there is a recoverable thread. According to the rule, when the execution of the task by the thread in step S28 of FIG. 16, step S39 of FIG. 17, and step S42 of FIG. 18 ends, and the control returns to the thread scheduler 122, the processing of FIG. 21 may be executed. In the present embodiment, however, an identical thread may continuously execute a plurality of tasks. Consequently, the processing of FIG. 21 is performed in a period after the thread finishes execution of one task till the same thread executes a next task. For example, the processing of FIG. 21 may be executed in a period from immediately before the execution of step S57 to immediately after the execution of step S58 in FIG. 19. In this case, the processing of FIG. 21 may be performed by the thread, in place of the thread scheduler 122.

In addition, as another method, the processing of FIG. 21 may be executed each time a task function is executed. For example, each time the execution of the function in step S61 of FIG. 20 ends, the processing of FIG. 21 is executed. Even in this case, the processing of FIG. 21 may be performed by the thread, in place of the thread scheduler 122.

The processing functions of the apparatuses (for example, the information processor 10 and the storage controllers 100 and 200) illustrated in each of the above embodiments may be implemented by a computer. In such a case, a program in which processing contents of the functions which each of the apparatuses is equipped with are written is provided to a computer, and the computer executes the program. Consequently, the functions described above are implemented over the computer. The program in which the processing contents are written may be stored on a computer-readable recording medium. Examples of the computer-readable recording medium include a magnetic storage device, an optical disc, a magneto-optical recording medium, and a semiconductor memory. Examples of the magnetic storage device include an HDD and a magnetic tape. Examples of the optical disc include a compact disc (CD), a digital versatile disc (DVD), and a Blu-ray Disc (BD, registered trademark). Examples of the magneto-optical recording medium include a magneto-optical disk (MO).

When the program is to be distributed, for example, portable recording media, such as DVDs and CDs, on which the program is recorded are sold. The program may be stored in a storage device of a server computer and may be transferred from the server computer to another computer via a network.

A computer that executes the program stores the program recorded on the removable recording medium or the program transferred from the server computer, for example, in a storage device thereof. The computer then reads the program from the storage device thereof and performs processing according to the program. The computer may also directly read the program from the removable recording medium and perform processing according to the program. Each time a program is transferred from the server computer coupled to the computer via the network, the computer may sequentially perform processing according to the received program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
    a memory that stores a first queue and a second queue, the first queue being registered a newly generated task, the second queue being registered a thread in an executable state among threads for executing at least one task of a plurality of tasks; and
    a processor coupled to the memory and configured to perform a process including:
    judging execution priority, when execution of a first task by a first thread ends, between a second task registered at a head of the first queue and a second thread registered at a head of the second queue,
    retrieving, when the judging judges that the second thread is to be executed before the second task, the second thread from the second queue and executing a task, to which the second thread is assigned, by the second thread, and
    retrieving, when the judging judges that the second task is to be executed before the second thread, the second task from the first queue and executing the second task by the first thread.

2. The information processing apparatus according to claim 1, wherein the process further comprising:
    when a new task is generated, registering the new task to a tail end of the first queue, and acquiring a task count value from a counter and adding the acquired task count value to the new task, the counter updating a count value of the counter each time the task count value or a thread count value is acquired,
    when registering the thread in the executable state to a tail end of the second queue, acquiring the thread count value from the counter and adding the acquired thread count value to the thread in the executable state, and
    wherein in the judging of the execution priority, the execution priority is judged based on a result of a comparison of the task count value added to the second task and the thread count value added to the second thread.

3. The information processing apparatus according to claim 2, wherein the process further comprising:
    when a yield halts execution of the first task by the first thread, registering the first thread to the tail end of the second queue and acquiring the thread count value from the counter to add the acquired thread count value to the first thread.

4. The information processing apparatus according to claim 2, wherein the process further comprising:
    when occurrence of standby halts the execution of the first task by the first thread, causing the first thread to suspend and transit to a standby state, and
    when the first thread recovers from the standby state, registering the first thread to the tail end of the second queue and acquiring the thread count value from the counter to add the acquired thread count value to the first thread.

5. The information processing apparatus according to claim 1, wherein the process further comprising:
    when the execution of the first task by the first thread halts, judging the execution priority, and
    when the judging judges that the second thread is to be executed before the second task, retrieving the second thread from the second queue and executing the task, to which the second thread is assigned, by the second thread, and
    when the judging judges that the second task is to be executed before the second thread, assigning to the second task a third thread that is not assigned to a task, and executing the second task by the third thread.

6. The information processing apparatus according to claim 1, wherein
    the memory further stores a third queue in which an unassigned thread that is not assigned to a task is registered, and
    when the judging judges that the second thread is to be executed before the second task, the processor registers the first thread as the unassigned thread in the third queue.

7. A non-transitory computer readable storage medium storing an execution control program, which when executed, causes a computer to perform:
    judging execution priority, when execution of a first task by a first thread ends, between a second task registered at a head of a first queue and a second thread registered at a head of a second queue, wherein the first queue being registered a newly generated task, the second queue being registered a thread in an executable state among threads for executing at least one task of a plurality of tasks;
    retrieving, when the judging judges that the second thread is to be executed before the second task, the second thread from the second queue and executing a task, to which the second thread is assigned, by the second thread, and retrieving, when the judging judges that the second task is to be executed first, the second task from the first queue and executing the second task by the first thread.

8. The non-transitory computer readable storage medium according to claim 7, the execution control program further causing the computer to perform:
when a new task is generated, registering the new task to a tail end of the first queue, and acquiring a task count value from a counter and adding the acquired task count value to the new task, the counter updating a count value of the counter each time the task count value or a thread count value is acquired,
when registering the thread in the executable, state to a tail end of the second queue, acquiring the thread count value from the counter and add the acquired thread count value to the thread in the executable state, and
wherein in the judging of the execution priority, the execution priority is judged based on a result of a comparison of the task count value added to the second task and the thread count value added to the second thread.

9. The non-transitory computer readable storage medium according to claim 8, the execution control program further causing the computer to perform:
when a yield halts execution of the first task by the first thread, registering the first thread to the tail end of the second queue and acquiring the thread count value from the counter to add the acquired thread count value to the first thread.

10. The non-transitory computer readable storage medium according to claim 8, the execution control program further causing the computer to perform:
when occurrence of standby halts the execution of the first task by the first thread, causing the first thread to suspend and transit to a standby state, and
when the first thread recovers from the standby state, register the first thread to the tail end of the second queue and acquiring the thread count value from the counter to add the acquired thread count value to the first thread.

11. The non-transitory computer readable storage medium according to claim 7, the execution control program further causing the computer to perform:
when the execution of the first task by the first thread halts, judging the execution priority, and
when the judging judges that the second thread is to be executed before the second task, retrieving the second thread from the second queue and execute the task, to which the second thread is assigned by the second thread, and
when the judging judges that the second task is to be executed before the second thread, assign to the second task a third thread that is not assigned to a task, and execute the second task by the third thread.

12. The non-transitory computer readable storage medium according to claim 7, the execution control program further causing the computer to perform:
when the judging judges that the second thread is to be executed before the second task, register the first thread as the unassigned thread in a third queue in which an unassigned thread that is not assigned to a task is registered.

13. A storage controller of a computer system for multi-thread processing of a plurality of tasks, the storage controller comprising:
a storage configured to store a plurality of queues including a first queue and a second queue, the first queue includes at least one task that is not assigned to a thread for processing, the second queue includes at least one thread assigned to execute a task;
a thread scheduler configured to select a current thread for execution based on priority information respectively associated with each of the at least one task within the first queue and each of the at least one thread within the second queue and to trigger execution of the selected current thread.

14. The storage controller according to claim 13, further comprising:
a counter configured to generate a value assigned to each of the at least one task within the first queue and each of the at least one thread within the second queue, the assigned values representing an execution order for the plurality of tasks.

15. The storage controller according to claim 14, wherein the thread scheduler is configured to select a first task from the first queue when a value assigned to the first task is less than a value assigned to a first thread in the second queue, to assign the first task to the current thread for execution to reduce a number of occurrences of context switches during the processing of the plurality of tasks.

16. The storage controller according to claim 15, wherein the current thread continuously executes a plurality of different tasks including the first task.

17. The storage controller according to claim 14, wherein the storage is further configured to store a third queue including at least one idle thread that is not assigned with a task, and
the thread scheduler is configured to add the current thread to an end of the third queue when a value assigned to the first thread in the second queue is less than a value assigned to a first task in the first queue.

18. The storage controller according to claim 17, wherein when a new task is generated from execution of a thread, the thread scheduler is configured to assign the new task to an idle thread obtained from the third queue to transit the idle thread to a worker thread assigned with the new task, added to an end of the second queue, and assigned a value generated by the counter.

* * * * *